(12) United States Patent
Kramer et al.

(10) Patent No.: US 10,579,324 B2
(45) Date of Patent: Mar. 3, 2020

(54) HEAD WORN WIRELESS COMPUTER HAVING HIGH-RESOLUTION DISPLAY SUITABLE FOR USE AS A MOBILE INTERNET DEVICE

(71) Applicant: BlueRadios, Inc., Englewood, CO (US)

(72) Inventors: Mark Kramer, Castle Rock, CO (US);
Wilfred I. Tucker, Centennial, CO (US); John Sample, Parker, CO (US);
Randy Dwayne Jones, Parker, CO (US)

(73) Assignee: BLUERADIOS, INC., Castle Rock, CO (US)

( * ) Notice: Subject to any disclaimer, the term of this patent is extended or adjusted under 35 U.S.C. 154(b) by 0 days.

(21) Appl. No.: 16/145,400

(22) Filed: Sep. 28, 2018

(65) Prior Publication Data

US 2019/0034146 A1    Jan. 31, 2019

Related U.S. Application Data

(63) Continuation of application No. 15/850,548, filed on Dec. 21, 2017, now abandoned, and a continuation of
(Continued)

(51) Int. Cl.
*G06F 3/147* (2006.01)
*G06F 1/16* (2006.01)
(Continued)

(52) U.S. Cl.
CPC .............. *G06F 3/147* (2013.01); *G06F 1/163* (2013.01); *G06F 1/3209* (2013.01);
(Continued)

(58) Field of Classification Search
CPC ...... G06F 1/163; G06F 1/3209; G06F 1/3215; G06F 3/011; G06F 3/017; G06F 3/0346;
(Continued)

(56) References Cited

U.S. PATENT DOCUMENTS

| 3,369,952 A | 2/1968 | Rieger |
| 4,567,479 A | 1/1986 | Boyd |

(Continued)

FOREIGN PATENT DOCUMENTS

| CN | 1735019 A | 2/2006 |
| CN | 1797299 A | 7/2006 |

(Continued)

OTHER PUBLICATIONS

Bluetooth Specification, Core Version 1.1, Published on Feb. 22, 2001 (Year: 2001).*

(Continued)

*Primary Examiner* — Brian T Pendleton
*Assistant Examiner* — Alan H Luong
(74) *Attorney, Agent, or Firm* — Gearhart Law LLC

(57) ABSTRACT

A handheld wireless display device, having at least SVGA-type resolution, includes a wireless interface, such as Bluetooth™, WiFi™, Wimax™, cellular or satellite, to allow the device to utilize a number of different hosts, such as a cell phone, personal computer, media player. The display may be monocular or binocular. Input mechanisms, such as switches, scroll wheels, touch pads, allow selection and navigation of menus, playing media files, setting volume and screen brightness/contrast, activating host remote controls or performing other commands. The device may include MIM diodes, Hall effect sensors, or other position transducers and/or accelerometers to detect lateral movements along and rotational gestures around the X, Y and Z axes as gesture inputs and movement queues. These commands may change pages, scroll up, down or across an enlarged screen image, such as for web browsing. An embedded software driver (e.g., Microsoft Windows SideShow™) permits replicating a high-resolution screen display from a host PC. The device may repeatedly poll the host at intervals for updated content (Continued)

even when the host is powered off, asleep or hibernating, and may return the host to its previous power state.

1 Claim, 19 Drawing Sheets

Related U.S. Application Data application No. 15/802,908, filed on Nov. 3, 2017, which is a continuation-in-part of application No. 14/466,333, filed on Aug. 22, 2014, said application No. 15/850,548 is a continuation of application No. 12/934,429, filed as application No. PCT/US2009/038601 on Mar. 27, 2009, now Pat. No. 9,886,231, said application No. 14/466,333 is a continuation-in-part of application No. 12/348,646, filed on Jan. 5, 2009, now Pat. No. 8,909,296.

(60) Provisional application No. 61/127,026, filed on May 9, 2008, provisional application No. 61/072,223, filed on Mar. 28, 2008, provisional application No. 61/010,177, filed on Jan. 4, 2008.

(51) Int. Cl.
| | |
|---|---|
| *G06F 1/3209* | (2019.01) |
| *G06F 1/3215* | (2019.01) |
| *G06F 3/01* | (2006.01) |
| *G06F 3/0346* | (2013.01) |
| *G06F 3/0354* | (2013.01) |
| *G06F 3/0362* | (2013.01) |
| *G06F 3/0483* | (2013.01) |
| *G06F 3/0485* | (2013.01) |
| *G06F 3/0488* | (2013.01) |
| *G06F 3/14* | (2006.01) |

(52) U.S. Cl.
CPC ............ *G06F 1/3215* (2013.01); *G06F 3/011* (2013.01); *G06F 3/017* (2013.01); *G06F 3/0346* (2013.01); *G06F 3/0362* (2013.01); *G06F 3/03547* (2013.01); *G06F 3/0483* (2013.01); *G06F 3/0485* (2013.01); *G06F 3/04886* (2013.01); *G06F 3/1423* (2013.01); *G06F 3/1454* (2013.01); *G09G 2370/16* (2013.01)

(58) Field of Classification Search
CPC .. G06F 3/03547; G06F 3/0362; G06F 3/0483; G06F 3/0485; G06F 3/04886; G06F 3/1423; G06F 3/1454; G06F 3/147; G06F 3/0484; G06F 3/0486; G09G 2370/16
USPC ................. 725/141; 345/7, 87, 169, 23, 204
See application file for complete search history.

(56) References Cited

U.S. PATENT DOCUMENTS

| | | |
|---|---|---|
| 5,005,213 A | 4/1991 | Hanson et al. |
| 5,208,449 A | 5/1993 | Eastman et al. |
| 5,594,469 A | 1/1997 | Freeman et al. |
| 5,689,619 A | 11/1997 | Smyth |
| 5,698,834 A | 12/1997 | Worthington et al. |
| 5,742,263 A | 4/1998 | Wang et al. |
| 5,818,455 A | 10/1998 | Stone et al. |
| 5,900,908 A | 5/1999 | Kirkland |
| 5,990,793 A | 11/1999 | Bieback |
| 6,010,216 A | 1/2000 | Jesiek |
| 6,073,034 A | 6/2000 | Jacobsen et al. |
| 6,084,556 A | 7/2000 | Zwern |
| 6,108,197 A | 8/2000 | Janik |
| 6,151,208 A | 11/2000 | Bartlett |
| 6,192,343 B1 | 2/2001 | Morgan et al. |
| 6,198,462 B1 | 3/2001 | Daily et al. |
| 6,204,974 B1 | 3/2001 | Spitzer |
| 6,313,864 B1 | 11/2001 | Tabata et al. |
| 6,325,507 B1 | 12/2001 | Jannard et al. |
| 6,349,001 B1 | 2/2002 | Spitzer |
| 6,369,952 B1 | 4/2002 | Rallison et al. |
| 6,408,257 B1 | 6/2002 | Harrington et al. |
| 6,532,446 B1 | 3/2003 | King |
| 6,538,676 B1 | 3/2003 | Peters |
| 6,678,906 B1 | 8/2004 | Thompson |
| 6,778,906 B1 | 8/2004 | Hennings et al. |
| 6,798,391 B2 | 9/2004 | Peterson, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,965,862 B2 | 11/2005 | Schuller |
| 6,966,647 B2 | 11/2005 | Jannard et al. |
| 7,004,582 B2 | 2/2006 | Jannard et al. |
| 7,013,009 B2 | 3/2006 | Warren |
| 7,068,258 B2 | 6/2006 | Cone et al. |
| 7,082,393 B2 | 7/2006 | Lahr |
| 7,088,234 B2 | 8/2006 | Naito et al. |
| 7,147,324 B2 | 12/2006 | Jannard et al. |
| 7,150,526 B2 | 12/2006 | Jannard et al. |
| 7,158,096 B1 | 1/2007 | Spitzer |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,231,846 B2 | 6/2007 | Marhefka et al. |
| 7,249,846 B2 | 7/2007 | Grand et al. |
| 7,278,734 B2 | 10/2007 | Jannard et al. |
| 7,280,096 B2 | 10/2007 | Marvit et al. |
| 7,312,981 B2 | 12/2007 | Carroll |
| 7,325,065 B1 | 1/2008 | Watkins |
| 7,331,666 B2 | 2/2008 | Swab et al. |
| 7,409,567 B2 | 8/2008 | Hammes et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,501,995 B2 | 3/2009 | Morita et al. |
| 7,512,414 B2 | 3/2009 | Jannard et al. |
| 7,515,414 B2 | 3/2009 | Jannard et al. |
| 7,620,432 B2 | 11/2009 | Willins et al. |
| 7,620,433 B2 | 11/2009 | Bodley |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,900,070 B2 | 3/2011 | Wu et al. |
| 7,917,608 B2 | 3/2011 | Tsunoda et al. |
| 7,918,556 B2 | 4/2011 | Lewis |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard |
| 7,997,723 B2 | 8/2011 | Pienimaa et al. |
| 8,010,156 B2 | 8/2011 | Warren |
| 8,020,989 B2 | 9/2011 | Jannard et al. |
| 8,025,398 B2 | 9/2011 | Jannard |
| 8,060,014 B2 | 11/2011 | Ueda et al. |
| 8,072,393 B2 | 12/2011 | Riechel |
| 8,092,011 B2 | 1/2012 | Sugihara et al. |
| 8,098,439 B2 | 1/2012 | Amitai et al. |
| 8,108,143 B1 | 1/2012 | Tester |
| 8,123,352 B2 | 2/2012 | Matsumoto et al. |
| 8,140,197 B2 | 3/2012 | Lapidot et al. |
| 8,164,773 B2 | 4/2012 | Montierth et al. |

(56) References Cited

U.S. PATENT DOCUMENTS

| | | |
|---|---|---|
| 8,170,262 B1 | 5/2012 | Liu |
| 8,184,983 B1 | 5/2012 | Ho et al. |
| 8,212,859 B2 | 7/2012 | Tang et al. |
| 8,327,295 B2 | 12/2012 | Ikeda et al. |
| 8,577,427 B2 | 11/2013 | Serota |
| 8,838,075 B2 | 9/2014 | Basir et al. |
| 8,855,719 B2 | 10/2014 | Jacobsen et al. |
| 8,862,186 B2 | 10/2014 | Jacobsen et al. |
| 8,885,719 B2 | 11/2014 | Kondo et al. |
| 8,929,954 B2 | 1/2015 | Jacobsen et al. |
| 9,118,875 B2 | 8/2015 | Ida |
| 9,122,307 B2 | 9/2015 | Jacobsen et al. |
| 9,235,262 B2 | 1/2016 | Jacobsen et al. |
| 9,294,607 B2 | 3/2016 | Jacobsen et al. |
| 9,301,085 B2 | 3/2016 | Parkinson et al. |
| 9,316,827 B2 | 4/2016 | Lindley et al. |
| 9,369,760 B2 | 6/2016 | Jacobsen et al. |
| 9,507,772 B2 | 11/2016 | Parkinson et al. |
| 9,817,232 B2 | 11/2017 | Lindley et al. |
| 9,886,231 B2 | 2/2018 | Jacobsen et al. |
| 10,013,976 B2 | 7/2018 | Woodall et al. |
| 2001/0003712 A1 | 6/2001 | Roelofs |
| 2001/0034250 A1 | 10/2001 | Chadha |
| 2001/0035845 A1 | 11/2001 | Zwern |
| 2002/0015008 A1 | 2/2002 | Kishida et al. |
| 2002/0030649 A1* | 3/2002 | Zavracky ............ G02B 27/017 345/87 |
| 2002/0044152 A1 | 4/2002 | Abbott et al. |
| 2002/0065115 A1 | 5/2002 | Lindholm |
| 2002/0094845 A1 | 7/2002 | Inasaka |
| 2002/0099854 A1* | 7/2002 | Jorgensen ............... H04L 1/20 709/249 |
| 2002/0113755 A1 | 8/2002 | Lee |
| 2002/0116392 A1 | 8/2002 | McGrath et al. |
| 2002/0154070 A1 | 10/2002 | Sato et al. |
| 2002/0158812 A1 | 10/2002 | Pallakoff |
| 2002/0158815 A1 | 10/2002 | Zwern |
| 2003/0001823 A1 | 1/2003 | Oya et al. |
| 2003/0016253 A1 | 1/2003 | Aoki et al. |
| 2003/0017846 A1 | 1/2003 | Estevez et al. |
| 2003/0046401 A1 | 3/2003 | Abbott et al. |
| 2003/0051083 A1 | 3/2003 | Striemer |
| 2003/0063043 A1 | 4/2003 | Girard |
| 2003/0065805 A1 | 4/2003 | Barnes |
| 2003/0067536 A1 | 4/2003 | Boulanger et al. |
| 2003/0068057 A1 | 4/2003 | Miller et al. |
| 2003/0117587 A1 | 6/2003 | Olson et al. |
| 2003/0217166 A1 | 11/2003 | Dal Canto et al. |
| 2003/0222917 A1 | 12/2003 | Trantow |
| 2004/0031054 A1 | 2/2004 | Dankworth et al. |
| 2004/0041989 A1 | 3/2004 | Olson et al. |
| 2004/0046778 A1 | 3/2004 | Niranjan et al. |
| 2004/0102967 A1 | 5/2004 | Furuta et al. |
| 2004/0113867 A1 | 6/2004 | Tomine et al. |
| 2004/0162106 A1* | 8/2004 | Monroe ............... H04W 88/06 455/552.1 |
| 2004/0193413 A1 | 9/2004 | Wilson et al. |
| 2004/0210852 A1 | 10/2004 | Balakrishnan et al. |
| 2004/0229658 A1* | 11/2004 | Kim ..................... H04M 1/05 455/569.1 |
| 2004/0267527 A1 | 12/2004 | Creamer et al. |
| 2005/0047629 A1 | 3/2005 | Farrell et al. |
| 2005/0086550 A1 | 4/2005 | Hammes et al. |
| 2005/0108643 A1 | 5/2005 | Schybergson et al. |
| 2005/0114140 A1 | 5/2005 | Brackett et al. |
| 2005/0125840 A1 | 6/2005 | Anderson et al. |
| 2005/0201585 A1 | 9/2005 | Jannard et al. |
| 2005/0212749 A1 | 9/2005 | Marvit et al. |
| 2005/0237296 A1 | 10/2005 | Lee |
| 2005/0245292 A1 | 11/2005 | Bennett et al. |
| 2005/0261890 A1 | 11/2005 | Robinson |
| 2005/0264527 A1 | 12/2005 | Lin |
| 2005/0286466 A1 | 12/2005 | Tagg et al. |
| 2006/0010368 A1 | 1/2006 | Kashi |
| 2006/0028400 A1 | 2/2006 | Lapstun et al. |
| 2006/0061551 A1 | 3/2006 | Fateh |
| 2006/0074624 A1 | 4/2006 | Sahashi |
| 2006/0105806 A1 | 5/2006 | Vance et al. |
| 2006/0109234 A1 | 5/2006 | Hong et al. |
| 2006/0109237 A1 | 5/2006 | Morita et al. |
| 2006/0132382 A1 | 6/2006 | Jannard |
| 2006/0166705 A1 | 7/2006 | Seshadri et al. |
| 2006/0178085 A1 | 8/2006 | Sotereanos et al. |
| 2006/0212611 A1 | 9/2006 | Fujii et al. |
| 2006/0220108 A1 | 10/2006 | Hashimoto |
| 2006/0221266 A1 | 10/2006 | Kato et al. |
| 2006/0238877 A1 | 10/2006 | Ashkenazi et al. |
| 2007/0009125 A1 | 1/2007 | Frerking et al. |
| 2007/0030174 A1 | 2/2007 | Randazzo et al. |
| 2007/0038735 A1 | 2/2007 | Tsunoda et al. |
| 2007/0040035 A1 | 2/2007 | Kotlarsky et al. |
| 2007/0053544 A1 | 3/2007 | Jhao et al. |
| 2007/0093279 A1 | 4/2007 | Janik |
| 2007/0121423 A1 | 5/2007 | Rioux |
| 2007/0153374 A1 | 7/2007 | Travers |
| 2007/0171921 A1 | 7/2007 | Wookey et al. |
| 2007/0103388 A1 | 8/2007 | Spitzer |
| 2007/0180979 A1 | 8/2007 | Rosenberg |
| 2007/0220108 A1 | 9/2007 | Whitaker |
| 2007/0238475 A1 | 10/2007 | Goedken |
| 2007/0247449 A1* | 10/2007 | Mack .................... G06F 3/023 345/204 |
| 2007/0260905 A1 | 11/2007 | Marsden et al. |
| 2007/0265495 A1 | 11/2007 | Vayser |
| 2007/0297005 A1 | 12/2007 | Montierth et al. |
| 2008/0021777 A1 | 1/2008 | Mack et al. |
| 2008/0052643 A1 | 2/2008 | Ike et al. |
| 2008/0055194 A1 | 3/2008 | Baudino et al. |
| 2008/0084992 A1 | 4/2008 | Peddireddy et al. |
| 2008/0089545 A1 | 4/2008 | Jannard et al. |
| 2008/0120141 A1 | 5/2008 | Kariathungal et al. |
| 2008/0144854 A1 | 6/2008 | Abreu |
| 2008/0171561 A1 | 7/2008 | Irony et al. |
| 2008/0180640 A1 | 7/2008 | Ito |
| 2008/0190640 A1 | 7/2008 | Gorman |
| 2008/0198324 A1 | 8/2008 | Fuziak |
| 2008/0200774 A1 | 8/2008 | Luo |
| 2008/0201634 A1 | 8/2008 | Gibb et al. |
| 2008/0211768 A1 | 9/2008 | Breen et al. |
| 2008/0239080 A1 | 10/2008 | Moscato |
| 2008/0270621 A1 | 10/2008 | Haruki et al. |
| 2008/0270625 A1 | 10/2008 | Chaturvedi et al. |
| 2008/0291277 A1 | 11/2008 | Jacobsen et al. |
| 2009/0002640 A1 | 1/2009 | Yang et al. |
| 2009/0023395 A1 | 1/2009 | Chang et al. |
| 2009/0033764 A1 | 2/2009 | Hung et al. |
| 2009/0079839 A1 | 3/2009 | Fischer et al. |
| 2009/0093304 A1 | 4/2009 | Ohta |
| 2009/0099836 A1 | 4/2009 | Jacobsen et al. |
| 2009/0109054 A1 | 4/2009 | Ueda et al. |
| 2009/0117890 A1 | 5/2009 | Jacobsen et al. |
| 2009/0128448 A1 | 5/2009 | Riechel |
| 2009/0154719 A1 | 6/2009 | Wulff et al. |
| 2009/0160735 A1 | 6/2009 | Mack |
| 2009/0180195 A1 | 7/2009 | Cakmakci et al. |
| 2009/0182562 A1 | 7/2009 | Caire et al. |
| 2009/0204410 A1 | 8/2009 | Mozer et al. |
| 2009/0209205 A1 | 8/2009 | Kramer et al. |
| 2009/0213071 A1 | 8/2009 | Li et al. |
| 2009/0240488 A1 | 9/2009 | White et al. |
| 2009/0251409 A1 | 10/2009 | Parkinson et al. |
| 2010/0020229 A1 | 1/2010 | Hershey et al. |
| 2010/0033830 A1 | 2/2010 | Yung |
| 2010/0041447 A1 | 2/2010 | Graylin |
| 2010/0053069 A1 | 3/2010 | Tricoukes et al. |
| 2010/0073201 A1 | 3/2010 | Holcomb et al. |
| 2010/0106497 A1 | 4/2010 | Phillips |
| 2010/0117930 A1 | 5/2010 | Bacabara et al. |
| 2010/0119052 A1 | 5/2010 | Kambli |
| 2010/0121480 A1 | 5/2010 | Stelzer et al. |
| 2010/0128626 A1 | 5/2010 | Anderson et al. |
| 2010/0141554 A1 | 6/2010 | Devereaux et al. |
| 2010/0156812 A1 | 6/2010 | Stallings et al. |
| 2010/0164990 A1 | 7/2010 | Van Doorn |

(56) References Cited

U.S. PATENT DOCUMENTS

| | | |
|---|---|---|
| 2010/0169073 A1 | 7/2010 | Almagro |
| 2010/0171680 A1 | 7/2010 | Lapidot et al. |
| 2010/0182137 A1 | 7/2010 | Pryor |
| 2010/0204981 A1 | 8/2010 | Ribeiro et al. |
| 2010/0225734 A1 | 9/2010 | Weller et al. |
| 2010/0235161 A1 | 9/2010 | Kim et al. |
| 2010/0238184 A1 | 9/2010 | Janicki |
| 2010/0245585 A1 | 9/2010 | Fisher et al. |
| 2010/0250231 A1 | 9/2010 | Almagro |
| 2010/0271587 A1 | 10/2010 | Pavlopoulos |
| 2010/0273417 A1 | 10/2010 | Tian et al. |
| 2010/0277563 A1 | 11/2010 | Gupta et al. |
| 2010/0289817 A1 | 11/2010 | Meier et al. |
| 2010/0302137 A1 | 12/2010 | Benko et al. |
| 2010/0306711 A1 | 12/2010 | Kahn et al. |
| 2010/0309295 A1 | 12/2010 | Chow |
| 2011/0001699 A1 | 1/2011 | Jacobsen et al. |
| 2011/0084900 A1 | 4/2011 | Jacobsen et al. |
| 2011/0089207 A1 | 4/2011 | Tricoukes et al. |
| 2011/0090135 A1 | 4/2011 | Tricoukes et al. |
| 2011/0092825 A1 | 4/2011 | Gopinathan et al. |
| 2011/0134910 A1 | 6/2011 | Chao-Suren et al. |
| 2011/0169654 A1 | 7/2011 | Ketari |
| 2011/0187640 A1 | 8/2011 | Jacobsen et al. |
| 2011/0194029 A1 | 8/2011 | Herrmann et al. |
| 2011/0214082 A1 | 9/2011 | Osterhout et al. |
| 2011/0221656 A1 | 9/2011 | Haddick et al. |
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0238405 A1 | 9/2011 | Pedre |
| 2011/0248904 A1 | 10/2011 | Miyawaki et al. |
| 2011/0254698 A1 | 10/2011 | Eberl et al. |
| 2011/0254865 A1 | 10/2011 | Yee et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0056646 A1 | 3/2012 | Zaliva |
| 2012/0056846 A1 | 3/2012 | Zaliva |
| 2012/0062445 A1 | 3/2012 | Haddick et al. |
| 2012/0068914 A1 | 3/2012 | Jacobsen et al. |
| 2012/0075177 A1 | 3/2012 | Jacobsen et al. |
| 2012/0089392 A1 | 4/2012 | Larco et al. |
| 2012/0092208 A1 | 4/2012 | LeMire et al. |
| 2012/0099220 A1 | 4/2012 | Tamai et al. |
| 2012/0105740 A1 | 5/2012 | Jannard et al. |
| 2012/0110456 A1 | 5/2012 | Larco et al. |
| 2012/0114131 A1 | 5/2012 | Tricoukes et al. |
| 2012/0166203 A1 | 6/2012 | Fuchs et al. |
| 2012/0088245 A1 | 7/2012 | Rotter et al. |
| 2012/0173100 A1 | 7/2012 | Ellis |
| 2012/0188245 A1 | 7/2012 | Hyatt |
| 2012/0236025 A1 | 9/2012 | Jacobsen et al. |
| 2012/0287283 A1 | 11/2012 | You |
| 2012/0287284 A1 | 11/2012 | Jacobsen et al. |
| 2012/0302288 A1 | 11/2012 | Born et al. |
| 2013/0019182 A1 | 1/2013 | Gil et al. |
| 2013/0070930 A1 | 3/2013 | Johnson |
| 2013/0174205 A1 | 7/2013 | Jacobsen et al. |
| 2013/0231937 A1 | 9/2013 | Woodall et al. |
| 2013/0239000 A1 | 9/2013 | Parkinson et al. |
| 2013/0274985 A1 | 10/2013 | Lee et al. |
| 2013/0288753 A1 | 10/2013 | Jacobsen et al. |
| 2013/0289971 A1 | 10/2013 | Parkinson et al. |
| 2013/0300649 A1 | 11/2013 | Parkinson et al. |
| 2014/0003616 A1 | 1/2014 | Johnson et al. |
| 2014/0059263 A1 | 2/2014 | Rosenberg et al. |
| 2014/0093103 A1 | 4/2014 | Breece, III et al. |
| 2014/0111427 A1 | 4/2014 | Lindley et al. |
| 2014/0223299 A1 | 8/2014 | Han |
| 2014/0235169 A1 | 8/2014 | Parkinson et al. |
| 2014/0334644 A1 | 11/2014 | Selig et al. |
| 2014/0368412 A1 | 12/2014 | Jacobsen et al. |
| 2015/0039311 A1 | 2/2015 | Clark et al. |
| 2015/0072672 A1 | 3/2015 | Jacobsen et al. |
| 2015/0279354 A1 | 10/2015 | Gruenstein et al. |
| 2015/0346489 A1 | 12/2015 | Lindley et al. |
| 2018/0277114 A1 | 9/2018 | Woodall et al. |

FOREIGN PATENT DOCUMENTS

| | | |
|---|---|---|
| CN | 101196793 A | 6/2008 |
| CN | 101243392 A | 8/2008 |
| CN | 101349944 A | 1/2009 |
| CN | 101444087 A | 5/2009 |
| CN | 101581969 A | 11/2009 |
| CN | 101599267 A | 12/2009 |
| CN | 101620511 A | 1/2010 |
| CN | 101809651 A | 8/2010 |
| CN | 102460349 | 5/2012 |
| CN | 102460349 A | 5/2012 |
| CN | 102541438 A | 7/2012 |
| CN | 102612417 A | 12/2012 |
| CN | 102812417 A | 12/2012 |
| CN | 103180800 | 6/2013 |
| CN | 103180800 B | 6/2013 |
| CN | 104303177 A | 1/2015 |
| CN | 104520787 A | 4/2015 |
| CN | 104981767 A | 10/2015 |
| CN | 102812417 B | 3/2016 |
| CN | 103180800 B | 8/2016 |
| CN | 103620527 B | 8/2018 |
| CN | ZL 201380022177.5 | 8/2018 |
| CN | 10134994 A | 9/2018 |
| CN | 104520787 B | 10/2018 |
| DE | 10344062 A1 | 4/2005 |
| EP | 2207164 A2 | 7/2010 |
| EP | 2427812 A0 | 3/2012 |
| EP | 2616907 A0 | 7/2013 |
| EP | 2712432 A0 | 4/2014 |
| EP | 2842055 B1 | 3/2015 |
| EP | 2845075 A0 | 3/2015 |
| EP | 2941690 A0 | 11/2015 |
| JP | 02084686 | 3/1990 |
| JP | 09034895 A | 2/1997 |
| JP | 10020867 A | 1/1998 |
| JP | 2001100878 A | 4/2001 |
| JP | 2001506389 A | 5/2001 |
| JP | 2001202175 | 7/2001 |
| JP | 2001202175 A | 7/2001 |
| JP | 2001216069 A | 8/2001 |
| JP | 2002525769 A | 8/2002 |
| JP | 2003241880 A | 8/2003 |
| JP | 200454879 | 2/2004 |
| JP | 2004233117 A | 8/2004 |
| JP | 2005012377 A | 1/2005 |
| JP | 2005352619 A | 12/2005 |
| JP | 200709978 A | 3/2007 |
| JP | 2007079978 A | 3/2007 |
| JP | 2007213501 | 8/2007 |
| JP | 2007213501 A | 8/2007 |
| JP | 2008052590 A | 3/2008 |
| JP | 2008278536 | 11/2008 |
| JP | 2008278536 A | 11/2008 |
| JP | 2009179062 A | 8/2009 |
| JP | 2010102163 | 5/2010 |
| JP | 2010102163 A | 5/2010 |
| JP | 2011511935 | 4/2011 |
| JP | 2011511935 A | 4/2011 |
| JP | 2011198150 | 10/2011 |
| JP | 2011198150 A | 10/2011 |
| JP | 2012002568 | 1/2012 |
| JP | 2012002568 A | 1/2012 |
| JP | 2012044429 | 3/2012 |
| JP | 2012044429 A | 3/2012 |
| JP | 2012056568 | 3/2012 |
| JP | 2012056568 A | 3/2012 |
| JP | 2012174149 | 9/2012 |
| JP | 2013541092 A | 11/2013 |
| JP | 2015515701 A | 5/2015 |
| JP | 2015521404 A | 7/2015 |
| JP | 2016508271 A | 3/2016 |

(56) References Cited

FOREIGN PATENT DOCUMENTS

| | | |
|---|---|---|
| JP | 6082695 B2 | 2/2017 |
| JP | 2017188156 A | 10/2017 |
| JP | 2018032440 A | 3/2018 |
| JP | 6419262 B2 | 10/2018 |
| KR | 1020150023293 A | 3/2015 |
| WO | 1995021408 A1 | 8/1995 |
| WO | 1995023994 A1 | 9/1995 |
| WO | 9901838 A2 | 1/1999 |
| WO | 199901838 | 1/1999 |
| WO | 0017848 A1 | 9/1999 |
| WO | 0017848 A1 | 3/2000 |
| WO | 200017848 | 3/2000 |
| WO | 2000079327 | 12/2000 |
| WO | 2000079327 A1 | 12/2000 |
| WO | 2005017729 A2 | 2/2005 |
| WO | 2009076016 | 6/2009 |
| WO | 2009086016 A1 | 7/2009 |
| WO | 2009091639 A1 | 7/2009 |
| WO | 2009120984 | 10/2009 |
| WO | 2009120984 A1 | 10/2009 |
| WO | 2010019634 A | 2/2010 |
| WO | 2010129679 A1 | 11/2010 |
| WO | 20100129679 A1 | 11/2010 |
| WO | 2011051660 | 5/2011 |
| WO | 2011051660 A1 | 5/2011 |
| WO | 2011097226 | 8/2011 |
| WO | 2011097226 A1 | 8/2011 |
| WO | 2011114149 | 9/2011 |
| WO | 2011114149 A1 | 9/2011 |
| WO | 2012/025956 A1 | 3/2012 |
| WO | 2012040107 A1 | 3/2012 |
| WO | 2012040386 | 3/2012 |
| WO | 2012040386 A1 | 3/2012 |
| WO | 2012154938 A1 | 11/2012 |
| WO | 2013101438 A1 | 7/2013 |
| WO | 2013/162908 A1 | 10/2013 |
| WO | 2013/163293 A1 | 10/2013 |
| WO | 2014/107186 A1 | 7/2014 |
| WO | 2014/107410 A1 | 7/2014 |

OTHER PUBLICATIONS

Bluetooth, Specification of the Bluetooth System, Dec. 1, 1999, vol. 1.0B.

International Search Report and Written Opinion for PCT/US08/06147, dated Jul. 16, 2008.

International Preliminary Report on Patentability and Written Opinion for PCT/US2011/02337, dated Mar. 28, 2011, entitled "Wireless Hands-Free Computing Headset with Detachable Accessories Controllable by Motion, Body Gesture and/or Vocal Commands.".

Written Opinion for PCT/US2012/037284, dated Oct. 1, 2012, entitled "Headset Computer That Uses Motion and Voices to Control Information Display and Remote Devices.".

International Preliminary Report on Patentability for PCT/US2011/023337, dated Aug. 7, 2012, entitled "Wireless Hands-Free Computing Headset with Detachable Accessories Controllable by Motion, Body Gesture and/or Vocal Commands.".

Written Opinion for PCT/US2012/068686, dated Mar. 25, 2013, entitled "Wireless Hands-Free Computing Head Mounted Video Eyewear for Local/Remote Diagnosis and Repair.".

EP 12782481.1, Supplemental European Search Report, "Context Sensitive Overlays In Voice Controlled Headset Computer Displays," dated Sep. 29, 2014.

International Search Report for PCT/US2013/065927, dated Mar. 21, 2014, entitled, "Improved Headset Computer Operation Using Vehicle Sensor Feedback for Remote Control Vehicle,".

Morphew, M.E., et al., "Helmet Mounted Displays for Unmanned Aerial Vehicle Control," Proceedings of SPIE, vol. 5442, dated Oct. 20, 2004.

Notification Concerning Transmittal of International Preliminary Report on Patentability of PCT/US2012/037284, entitled, "Headset Computer That Uses Motion and Voices to Control Information Display and Remote Devices," dated Nov. 12, 2013, 7 pages.

International Search Report for PCT/US2011/02337, dated Mar. 28, 2011, entitled "Wireless Hands-Free Computing Headset with Detachable Accessories Controllable by Motion, Body Gesture and/or Vocal Commands.".

International Search Report and Written Opinion for PCT/US2013/065927, dated Mar. 21, 2014, entitled, "Improved Headset Computer Operation Using Vehicle Sensor Feedback for Remote Control Vehicle".

Morphew, M.E., et. al., Helmet Mounted Displays for Unmanned Aerial Vehicle Control, Proceedings of SPIE, vol. 4552, Oct. 20, 2004.

Notification Concerning Transmittal of International Preliminary Report on Patentability of PCT/US2012/037284, "Headset Computer That Uses Motion and Voices to Control Information Display and Remote Devices", dated Nov. 21, 2013, 7 pages.

International Search Report for International Application No. PCT/US08/06147, dated Jul. 16, 2008.

European Search Report for EP 1278248 1 dated Sep. 23, 2014.

International Search Report and Written Opinion for PCT/US2011/023337 dated Mar. 28, 2011 entitled "Wireless Hands-Free Computing Headset with Detachable Accessories Controllable by Motion, Body Gesture and/or Vocal Commands".

International Search Report and Written Opinion for PCT/US2012/037284 dated Oct. 1, 2012 entitled "Headset Computer That Uses Motion and Voices to Control Information Display and Remote Devices".

Transmittal of International Preliminary Report on Patentability for PCT/US2011/023337 dated Mar. 28, 2011 entitled "Wireless Hands-Free Computing Headset with Detachable Accessories Controllable by Motion, Body Gesture and/or Vocal Commands".

International Search Report and Written Opinion for PCT/US2012/068686 dated Mar. 25, 2013 entitled "Wireless Hands-Free Computing Head Mounted Video Eyewear for Local/Remote Diagnosis and Repair".

\* cited by examiner

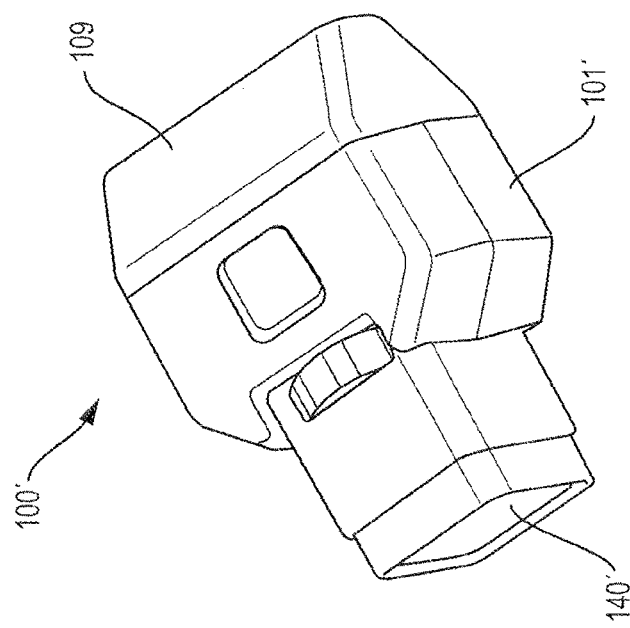
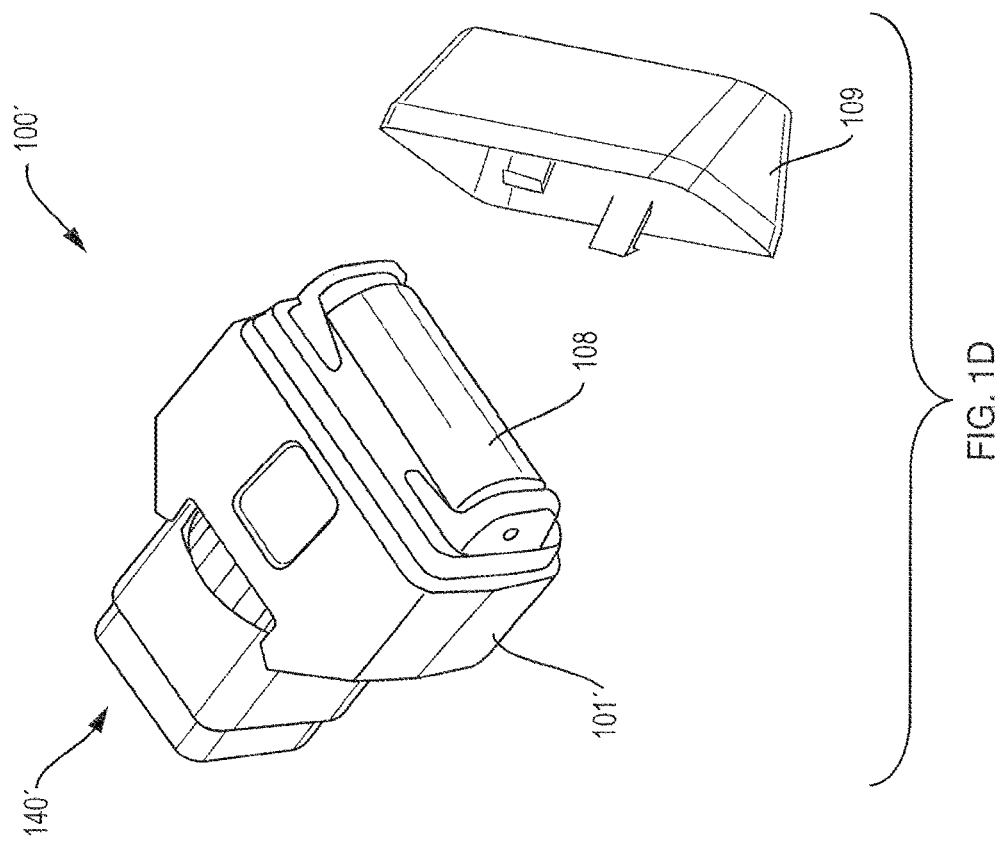

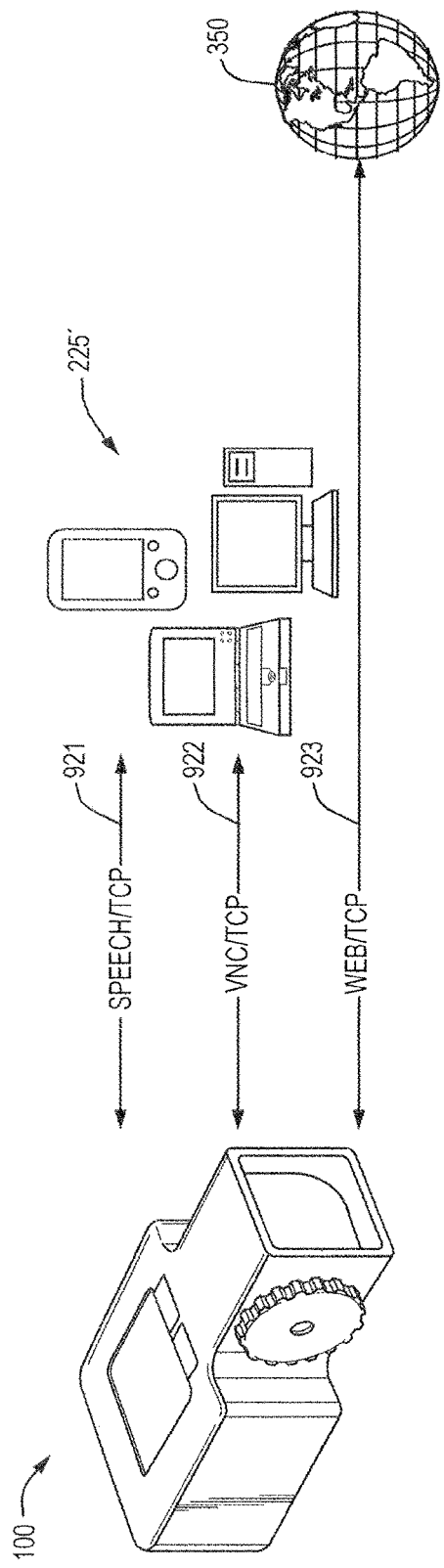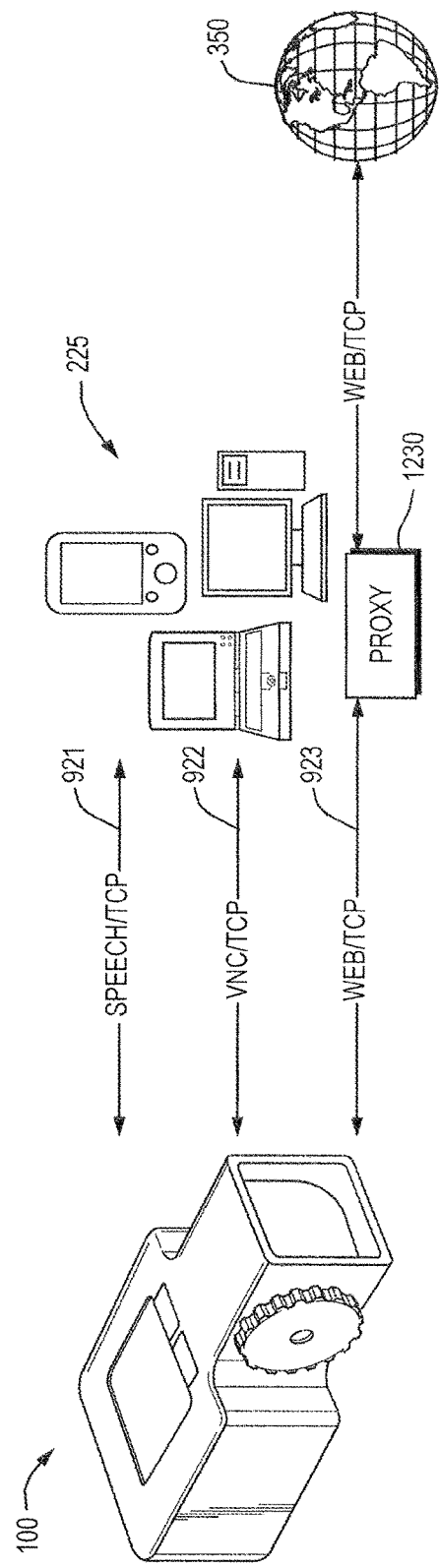
FIG. 12A
FIG. 12B

HEAD WORN WIRELESS COMPUTER HAVING HIGH-RESOLUTION DISPLAY SUITABLE FOR USE AS A MOBILE INTERNET DEVICE

CLAIM OF PRIORITY

This application is a continuation of U.S. application Ser. No. 15/850,548 filed on Dec. 21, 2017 which is a continuation of U.S. application Ser. No. 12/934,429 (now U.S. Pat. No. 9,886,231), which is the U.S. National Stage Application of International Application No. PCT/US2009/038601, filed on Mar. 27, 2009, which claims the benefit of U.S. Provisional Application No. 61/127,026, filed on May 9, 2008, U.S. Provisional Application No. 61/072,223, filed on Mar. 28, 2008. This application also claims priority to U.S. application Ser. No. 15/802,908 filed on Nov. 3, 2017, which is a continuation in part of U.S. application Ser. No. 14/466,333 filed on Aug. 22, 2014, which is a continuation in part of U.S. application Ser. No. 12/348,646 filed on Jan. 5, 2009 (now U.S. Pat. No. 8,909,296) which claims priority to U.S. Provisional Application No. 61/010,177 filed on Jan. 4, 2008. The entire teachings of the above applications are incorporated herein by reference.

FIELD OF THE EMBODIMENTS

The field of the invention and its embodiments relate to head mounted devices having a display.

BACKGROUND OF THE EMBODIMENTS

Recent technology convergence between mobile phones and digital media players, such as with the iPhone™, are increasingly placing small, portable devices capable of storing large amounts of high-resolution computer graphics and even video content in the hands of consumers. While these handheld devices typically include a display screen, the visual experience of a high-resolution, large format display can never be replicated in such a device, simply because of the physical size limitations expected of a hand held device.

As a result, consumers are now seeking high-quality, portable, color displays to augment their handheld video devices. One such display is worn on the user's face or head similar to a pair of eyeglasses or headphones. Through recent dramatic developments in optical technologies, these devices can provide the appearance of a large format, high-resolution display.

One example of such a device is found in U.S. Pat. No. 7,088,234 issued to Naito, et al. and assigned to Matsushita Electrical Industries. The wearable information device described in that patent can display certain information to notify the user, e.g., information about arrival of an e-mail, etc.

Another such device is described in U.S. Pat. No. 7,158,096 issued to Spitzer and assigned to MyVu Corporation. That device includes a projection type display attached to one end of a head-mountable support. An eyepiece assembly is attached to a second end of the support. The support maintains the projection system and the eyepiece assembly in alignment along an optical path.

Unfortunately while such head-mounted displays have found some use they do not provide the best viewing experience in all situations. For example, a number of decisions must be made by the designer of such a device with respect to their mechanical packaging and styling. That is, these head-mounted display arrangements invariable require some sort of apparatus to permit the user to mount the device on their head, and then find an optimal position for the display relative to the user's eye. The inherent constraints of such a device thus do not provide optimal viewing comfort for all users.

Secondly, such prior art head worn displays are limiting in the overall functions that can be performed. Such tasks can include viewing images, graphics, or movies with audio. This can be for gaming purposes or recreational viewing of images from a television broadcast or video. Such prior art head worn displays are severely limited in connection with other day-to-day desired functional computing tasks. For example, the user may desire to use the display in connection with communication tasks, web browsing, running business applications, active navigation tasks, mobile instruction with real time updates or using the display to wirelessly control other devices that the user regularly uses (or comes in contact with) on a day-to-day basis. These secondary devices can include a Personal Digital Assistant (PDA), a notebook computer, a desktop computer, a mobile phone, a vehicle, a wireless network, devices associated with a wireless service hot spot, a thin client, or other electronic devices or appliances. Such prior art head worn displays often cannot interface with (or slave) such devices to initiate and control running programs, initiate real time device functional changes, alter real time device operational parameters, enable local or remote wireless communication with mobile devices and/or otherwise perform wireless networks and services.

Thirdly, such prior art devices are not readily upgradeable to provide other functions that the user may desire. A user may desire, in some locations, to have some functional attributes of a particular software application or a particular hardware configuration, while in other locations the user may not desire to have those software applications or hardware configurations. In fact, the user may not use such a heavy display device with multiple heavy hardware configurations, and additional connections and drives and instead may wish to remove unnecessary hardware from the device so the device remains lightweight.

Fourth, users would enjoy more compact mobile devices that can access important data that are lightweight, and do not require users to carry relatively larger, and bulkier computers, such as notebook computers, laptops, tablet computing devices, or relatively larger media players. Additionally, users, when they do carry their laptops, often have to flip the laptop open, then boot the machine, which takes time. This is disfavored, especially, when the user wants a specific information quickly, such as, an address, e-mail, or relevant text from an e-mail attachment, while traveling.

Microsoft Windows SideShow™ is a software program that is in an operating system (OS) that supports a secondary screen on a mobile personal computer, such as a laptop computer, that is generally disposed on the rear of the laptop cover. With this additional secondary display, a user can access the Microsoft Windows SideShow™ software program to display images on the secondary display while the computer is in sleep mode or turned on or off.

Microsoft Windows SideShow™ uses convenient mini programs called Gadgets. These Gadget programs extend information from the laptop to other devices. Gadgets can run on computers operating with Microsoft Windows SideShow™ and update devices with information from the computer. Gadgets may allow viewing of information from the computer regardless of whether it is on, off, or in sleep mode. This saves power and a user's time by not requiring booting of the computer.

These gadget software programs are limiting and users desire a software gadget that permits wireless access to the laptop computer without the need to use any input device to continuously monitor. Additionally, users desire great amounts of information from the computer while the laptop computer, or PC, is on, off, or in sleep mode.

SUMMARY OF THE EMBODIMENTS

A handheld, high-resolution, microdisplay device provides greater convenience and mobility and avoids the problems of wired and wireless video headsets. The handheld wireless display device provides at least Super Video Graphics Array (SVGA) (800.times.600) display resolution, or even higher resolution such as Extended Graphics Array (XGA) (1024.times.768). The microdisplay component may be relatively small; preferably, the active area of the display being in the range of about 0.5 inches on the diagonal or less.

The handheld design format provides several advantages. First, overall styling is much easier and therefore more generally acceptable to a wide variety of users then head-mounted displays. Since the display unit and the human head are decoupled, hand movement of the unit itself may be used to find an optimal position of the device relative to the users eye. Viewing of the image on such a handheld device is also similar to the viewing in direct view large format display—either the head moves or the display moves for optimal viewing. The device may be adapted for placing on a stand or attached to a head band and the like for use over a long term time frame.

In a preferred embodiment, the handheld unit includes one or more metal-insulator-metal (MIM) diodes, Hall effect sensors, or other high-sensitivity position transducers and/or accelerometers that may indicate lateral movements along and rotational gestures around the X, Y and Z axes to serve as hand gesture inputs, movement queues and the like. These may be used to accept user inputs to change pages, scroll up, scroll down or across an enlarged screen image providing a more pleasant user experience for activities such as scrolling through web pages or engaging in mobile game playing. Alternatively, switches associated with or voice commands received at the device allow the user to select and navigate menus, play media files, set volume and screen brightness, activate controls for the host target device or perform other commands. Similarly, the device may be manipulated by voice commands, a Bluetooth mouse, a Bluetooth keyboard, key pads on the display housing and/or other devices as may be desired.

The display may be configured in either a monocular or binocular configuration. In a monocular configuration, the shape of the display unit may be wide parallel to the eyes so that one eye not looking at the image is blocked from viewing the surrounding. In a binocular configuration one may incorporate inter-pupillary distance (IPD) adjustment and or a user image focus mechanism. With the IPD adjustment, requirements for optics in a display may be relaxed. In return for this other optical characteristics such as distortion may also be improved so that the resolution is good across the entire plane of the image. An eye relief may be fairly large so that a user wearing eye glasses may use the unit comfortably.

In a preferred embodiment, the device contains external wireless connection to provide for ease of interface to many other types of devices. For example, a wireless communications controller associated with the device acts as a video link to a host device. Alternatively, connections with multiple hosts may be established. The connection may for example be provided by either a Bluetooth™, WiFi™, Wimax™, Cellular or Satellite wireless connection. The wireless interface also may support Microsoft Windows SideShow, Remote Desktop Protocol (RDP) or Virtual Network Computing (VNC) protocols. The use of these or other standard wireless interfaces allows the device to be adapted for use with a number of different other host devices without the need to change any hardware.

It might also be beneficial to use a Bluetooth™-type wireless physical layer. Bluetooth™ has become the most widely-adopted way to interface portable handheld devices to other equipment. Bluetooth™ also offers broader compatibility, lower power consumption, and other advantages over WiFi™. A Bluetooth™ proxy may be used to implement a packet switching gateway.

The host is any appropriate device that sources video information, such as a cell phone, personal computer (PC), laptop, media player and/or the like. In certain embodiments, the handheld wireless display device may repeatedly poll a host computing device for updated content at times the host computing device is on, off or in a reduced power mode, such as sleep or hibernate.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 1D-1E are perspective views of a second example embodiment handheld wireless display device with an alternate user input device, such as a scroll wheel, and a cover to prevent inadvertent activation of the user input device, respectively.

FIGS. 12A-12B are diagrams illustrating differences between a traditional Transmission Control Protocol (TCP) connection and a proxied TCP connection over a Bluetooth™ connection.

DESCRIPTION OF THE PREFERRED EMBODIMENTS

Figure 1A:
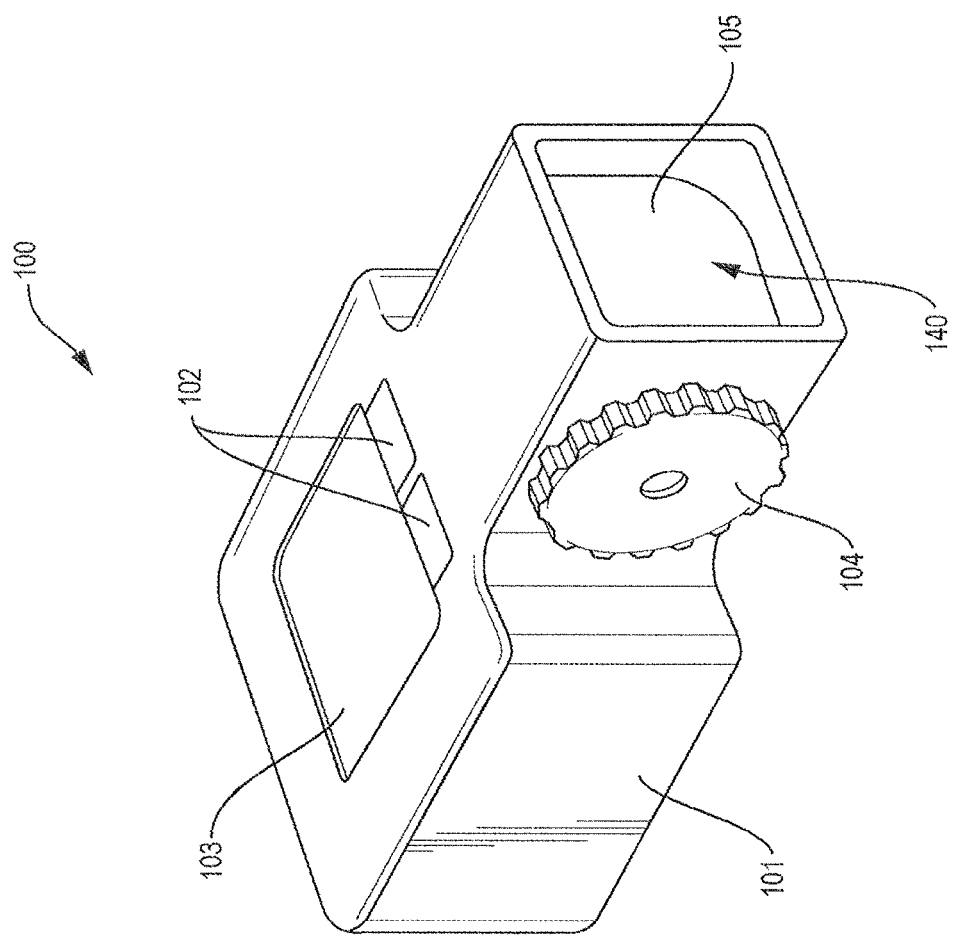
FIG. 1A is a perspective view of a first example embodiment handheld wireless display device.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1A is a perspective view of a first embodiment of a handheld wireless display device 100 having a housing 101 that incorporates a high-resolution (SVGA or better) microdisplay element 140. The housing 101 may also include a number of buttons 102, track pad 103, Capacitive or resistive touch pads 102, a small touch screen or track pad 103, and/or a scroll wheel 104 to allow a user to provide control inputs thereto. Audio input and/or output device(s), which may include microphone input and stereo outputs, may also be placed in the housing 101 (not shown). A Secure Digital (SD), eXteme Digital (xD), Universal Serial Bus (USB) integral SD (uSD) memory or other similar interfaces (not shown) may or may not be stored in the housing 101, and may be used to store application programs, kernel directives, configuration data, and/or connect to external devices.

The microdisplay element 140 is preferably a lightweight small form factor imaging unit. The image may or may not be magnified. Although not shown in FIG. 1A, the microdisplay element 140 is positioned relative to a prism or other optical elements in the same display housing 101 to assist with bringing images into user focus and/or substantially correcting for optical distortion, astigmatism, and chromatic aberrations. The optically enhanced (or not-enhanced) image is then directed such that the user of the handheld wireless display device may view the virtual image by looking directly into the optical component cover (glass or plastic) 105. The displayed image need not be projected to, or displayed on, the entire microdisplay element 140. Instead, the image may be displayed on a portion of the microdisplay element 140.

The microdisplay element 140 of the handheld wireless display device 100 may be advantageously viewed by looking out of the corner of the user's eye momentarily to view images, and then immediate return to the field of vision in front of the user. This encourages the user to use the handheld wireless display device 100 in day-to-day activities. Advantageously, the user may quickly look at the handheld wireless display device 100 and then quickly, safely and easily regain focus to other objects that are in front of the user. This is advantageous because the user is not confined to using the handheld wireless display device 100 in certain designated "safe" locations. The user's dominant eye is defined as the right or left eye that is the strongest or dominant in the user's day-to-day vision. In other embodiments, the handheld wireless display device 100 does not project an optically enhanced virtual image on the microdisplay element 140 but instead directly displays the optically magnified and enhanced virtual image to the user's desired (typically the dominant) eye.

The microdisplay element 140 may be a liquid crystal display (LCD), or an organic light emitting diode (OLED) based display. Various lightweight and high-resolution display configurations are possible and within the scope of the present disclosure. As one example, the microdisplay element 140 may be a 0.44 inch diagonal CyberDisplay SVGA LVS display with about 800.times.600 resolution from Kopin Corporation. Alternatively, the display component 140 may be a wide SVGA display with about 1024.times.600 resolution, an XVGA display with about 1,024.times.768 resolution, an SXGA display with 1,280.times.1,024 resolution or High Definition Television display with 1,920.times.1,080 resolution.

Such small, high-resolution active matrix liquid crystal displays (AMLCDs) are of the type generally described in issued U.S. Pat. No. 6,677,936 issued to Jacobson, et al. on Jan. 13, 2004 and assigned to Kopin Corporation, and as further described in a co-pending U.S. patent application Ser. No. 11/903,561, filed on Sep. 21, 2007, also to the same inventors and assigned to the same assignee.

The LCD may be fabricated using the thin film semiconductor processing techniques as described in co-pending U.S. patent application Ser. No. 11/893,594, filed on Aug. 16, 2007 and assigned to Kopin Corporation. With that technology, it has been found that the resulting thin film transistors reduce light photo sensitivity providing high display contrast.

The general circuit architecture for the LCD may be as described in issued U.S. Pat. No. 7,138,993 to Herrmann wherein integrated switches are used to handle high-resolution video signals at half the normal voltage levels. Shift register components used within the display electronics may be implemented according to co-pending U.S. patent application Ser. No. 11/985,347 filed on Nov. 14, 2007 and assigned to Kopin Corporation. This combination of these technologies provides low power operation suitable for running SVGA and higher resolution displays on battery power alone.

Figure 1C:
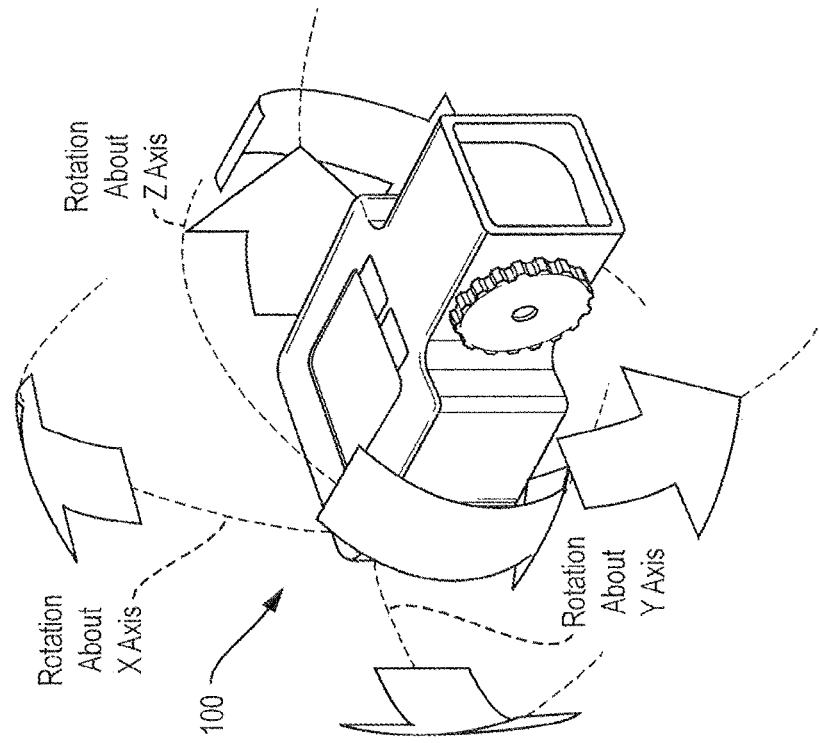
FIGS. 1B-1C are perspective views of the handheld wireless display device of FIG. 1A showing lateral movements along and rotational gestures around the X, Y and Z axes, respectively.
Figure 1B:
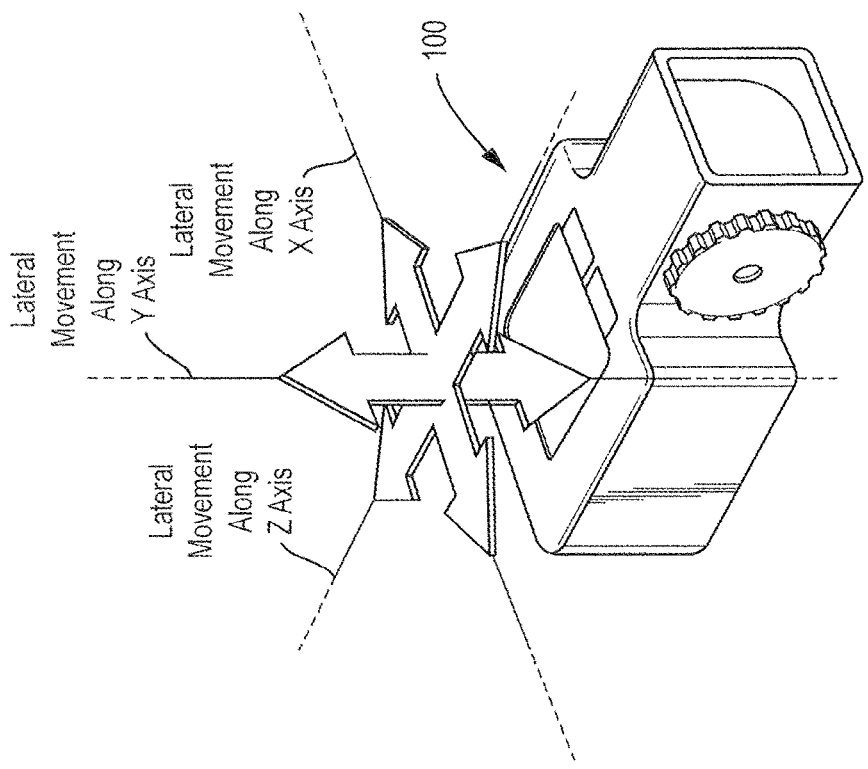

As illustrated and implied by the arrows in FIGS. 1B and 1C, the handheld wireless display device 100 may include accelerometers, Hall effect devices, metal-insulator-metal (MIM) diodes and/or other similar sensors or transducers as inputs. These devices inputs indicating lateral movements along and rotational gestures around the X, Y and Z axes to the control circuitry within the device to provide for user generated commands, user image or content control movements, scrolling image content and the like. These sensors are thus used to detect hand gestures which in turn allow the user to indicate a command to change pages while browsing the internet, or scroll up or down or across a large screen image, and or the like. The same movement input devices may be used for mobile game interface and other end uses.

Alternatively, as illustrated in FIGS. 1D and 1E, a scroll wheel 108 may be associated with the handheld wireless display device 100, in which case a cover 109 may be used to prevent inadvertent activation of the scroll wheel. In other arrangements, the handheld wireless display device 100 may be controlled by voice commands, with simple and/or advanced voice recognition features built into the circuitry and software within the handheld wireless display device. Other ways to control the handheld wireless display device 100 may include a separate keyboard such as may be connected through the included Bluetooth interface. In an alternate embodiment, the keyboard may be made integral to the handheld wireless display device 100 and/or projected via an optical image on the microdisplay element 140.

Figure 2:
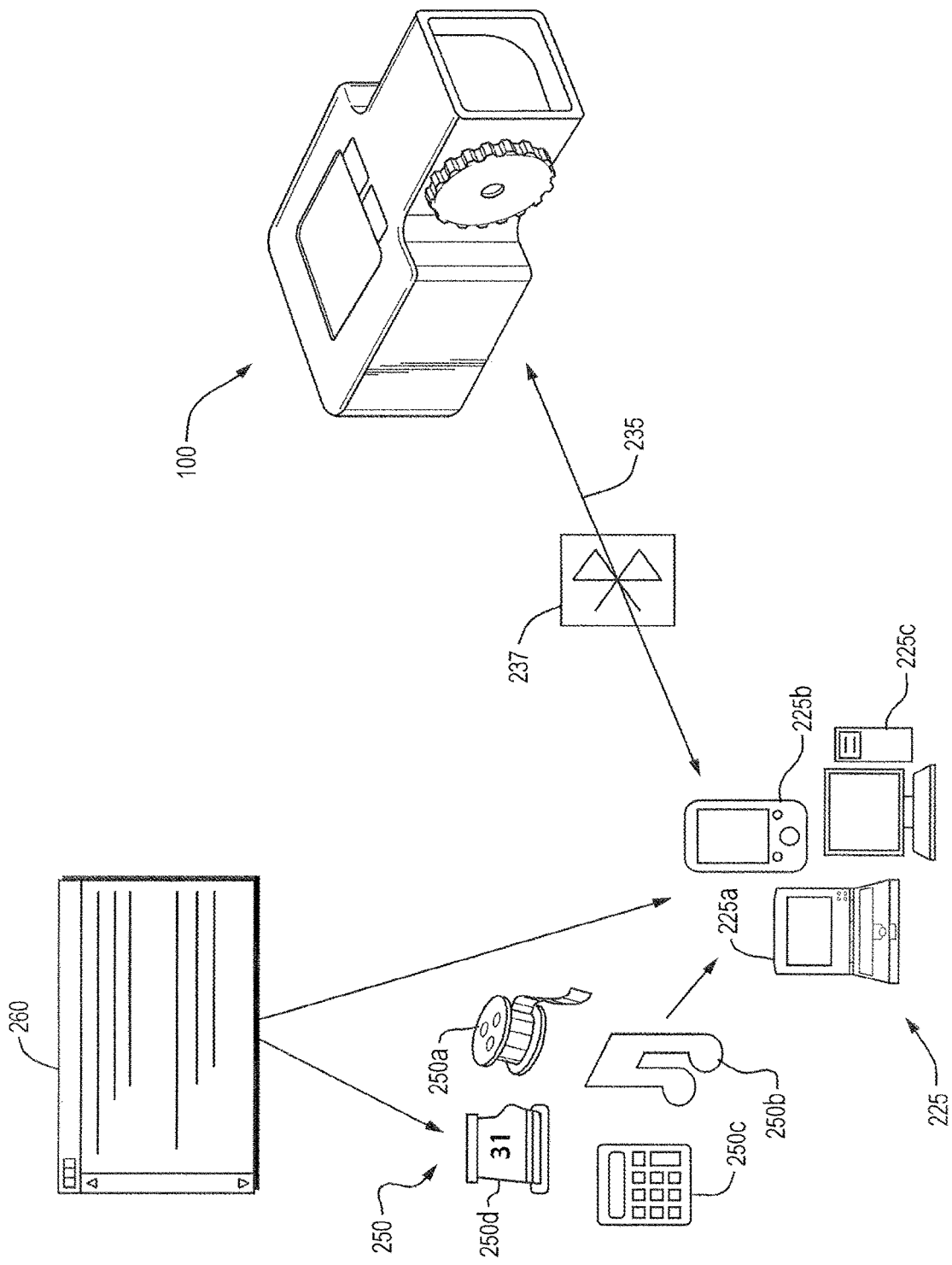
FIG. 2 is a diagram illustrating wireless communications between an example embodiment handheld wireless display device and host computing devices.

FIG. 2 is a diagram illustrating wireless communications between an example embodiment handheld wireless display device 100 and host computing devices 225. The handheld wireless display device 100 interrogates a host computing device 225 and is configured to establish two-way, or bidirectional a wireless communication link 235 with the host computing device 225 such that the host computing device 225 provides uplink and downlink data to the handheld wireless display device 100 in a bidirectional manner across the wireless communication link 235. In one embodiment, the handheld wireless display device 100 receives uplink data that is suitable to display content on the microdisplay element 140 of the handheld wireless display device 100.

The handheld wireless display device 100 also controls the host computing device 225, such as, for example, a wireless laptop 225a, to run business applications, retrieve e-mail, and run executable code, and applications from the laptop 225a across the wireless link 235. In this regard, the handheld wireless display device 100 may include an input device that transmits a wireless input signal to the host computing device 225. The input signal controls the host computing device 225 to provide control signals to run applications on the host computing device 225.

In response to the control signals, the handheld wireless display device 100 receives content from the host computing device 225 across the wireless communication link 235 with a high data transfer rate. Thereafter, using suitable program instructions and a converter (not shown), the handheld wireless display device 100 converts the content received across the wireless communications link 235 to multimedia including graphical video data to display images on the microdisplay element 140 depending on the specific host computing device 225.

The host computing device 225 then outputs a graphical output to the microdisplay element 140 for a remote display of applications operating at the host computing device 225 at the handheld wireless display device 100, which may be located a distance away from the host computing device 225. Host computing devices 225 source content 250 of various types for viewing on the microdisplay element 140, including video 250a, audio 250b, computer data 250c, and other types of information, such as calendar 250d, email and any number of types of data that are regularly found from host computing devices 225.

In one embodiment, the wireless communication link 235 uses short range or long range radio frequency (RF) signals over a designated channel to communicate content using a protocol known to both the handheld wireless display device 100 and host computing devices 225. In one embodiment, the Bluetooth connection may transport audio/video data over a first Bluetooth radio frequency (RF) channel and other data over a second RF channel. Preferably, the RF signals are low power and in a range of about 1.0 milliwatt (mWatt) to 100 mWatts. so as to transmit the RF signals across a desired distance, which may be from several feet or greater than twenty feet in length.

In one embodiment, the handheld wireless display device 100 uses a Bluetooth™ 237 communication standard to communicate with the host computing device 225. In one embodiment, the Bluetooth™ technology permits data communication at a data transfer rate of around 1 megabit per second (Mbps) with another computing device about 10 meters away using a 2.4 gigahertz (GHz) frequency. Although not preferred, wired interfaces such as USB, Recommended Standard (RS) 232 (RS-232) (serial) and/or RS-485 wired interfaces, an Ethernet interface, a telephone line interface, a modem interface, a digital subscriber line interface, a cable interface, or a personal area network interface may also be provided.

In another embodiment, the wireless communication link 235 may use Institute of Electrical and Electronics Engineers (IEEE) 802.11(b), or IEEE 802.11(g), or another standard. In yet another embodiment, the wireless communication link 235 may include Bluetooth™ 3.0 with a data transfer rate of about 480 Mbps, Ultra-Wide Band (UWB), Wireless USB (WUSB), Wireless High Definition (WirelessHD), Wireless High Definition Multimedia Interface (WHDMI), WiFi™, or any other high speed digital communication standard known in the art. In a further alternative embodiment, the handheld wireless display device 100 may communicate with the host computing device 225 using a wired connection, instead of link 235 such as, for example, a serial port, or a USB cable, or other wired connections. Alternatively, the wireless communication link 235 may include a Code Division Multiple Access (CDMA) standard, a Time Division Multiple Access (TDMA) standard, or Frequency Division Multiple Access (FDMA) standard or, alternatively, any other frequency hopping standard in spread spectrum communication known in the art to communicate data. Various protocol standards for wired and wireless communication are known in the art, and the present handheld wireless display device 100 is not limited to any specific link, or RF protocol.

Further, a software System Development Kit (SDK) 260 may be used by an application programmer to specify interfaces for host computing devices 225, thereby permitting content 250 to be displayed on microdisplay element 140. For a number of reasons, the handheld wireless display device 100 may not be able to simply display existing web and other types of content. In particular, the content 250 may need to be specially designed and implemented to fit the microdisplay element 140. To encourage this, the developer SDK 260 enables developers to quickly and easily develop the graphical portion of their applications. The backend of these same applications is then coded into a programmer's language of choice for the particular handheld wireless display device 100, as will be described in more detail below.

In certain embodiments in which the handheld wireless display device 100 is enabled with Microsoft Windows SideShow™, the host computing device 225 may run a Microsoft Windows SideShow™ gadget to make content available across the wireless communication link 235 to the handheld wireless display device 100. Preferably, the Microsoft Windows SideShow™ gadget running on the host computing device 225 may be accessed by the handheld wireless display device 100 over a wireless Bluetooth™, 802.11(b), 802.11(c), or 802.11(g) connection, such that the handheld wireless display device 100 may be located far in distance from the host computing device 225. Preferably, the handheld wireless display device 100 may be wirelessly connected to the host computing device 225 via the Internet. Therefore the handheld wireless display device 100 may connect to the host computing device 225 from anywhere in the world and may access data from a memory operatively connected to the host computing device 225.

The handheld wireless display device 100 is not limited to communicating with any specific host computing device 225, and the discussion above with regard to the laptop computer 225 is merely illustrative, and is not limiting. The handheld wireless display device 100 also may communicate with other host computing devices 225 including a personal computing device, such as, for example, a desktop or laptop computer that includes an operating system (OS), such as, for example, the Microsoft Windows Vista™ OS, Microsoft Windows Mobile™, Apple Mac OSX™ OS, Symbian OS compatible operating systems, Lenovo compatible operating systems, the Linux operating system, the UNIX operating system or another known suitable operating system that is Internet ready, and configured for wireless mobile operation.

Other host computing devices include a cell phone, Personal Digital Assistant (PDA), such as a PALM™ compatible device, desktop computer, tablet computer, mobile e-mail communication device, such as, for example, a Blackberry™ device or a Good Technology™ compatible device, or personal digital music or video player, such as, for example, an Apple I-Pod™ video and audio player, Microsoft Zune™ multimedia players, and other Motion Picture Experts Group (MPEG)-1 Audio Layer 3 (MP3) music players, digital video players, or drives. The host computing devices 225 also may include automotive systems, Global Position System (GPS) devices, Satellite Radio receivers or players, such as, for example, XM Satellite Radio™ or Sirius Satellite Radio™ compatible devices. The host computing devices 225 may also include mainframe computing devices, digital testing devices, diagnostic equipment, TIVO™ or other digital video recorder, set top cable box, or any other digital or analog device known in the art.

Figure 3:
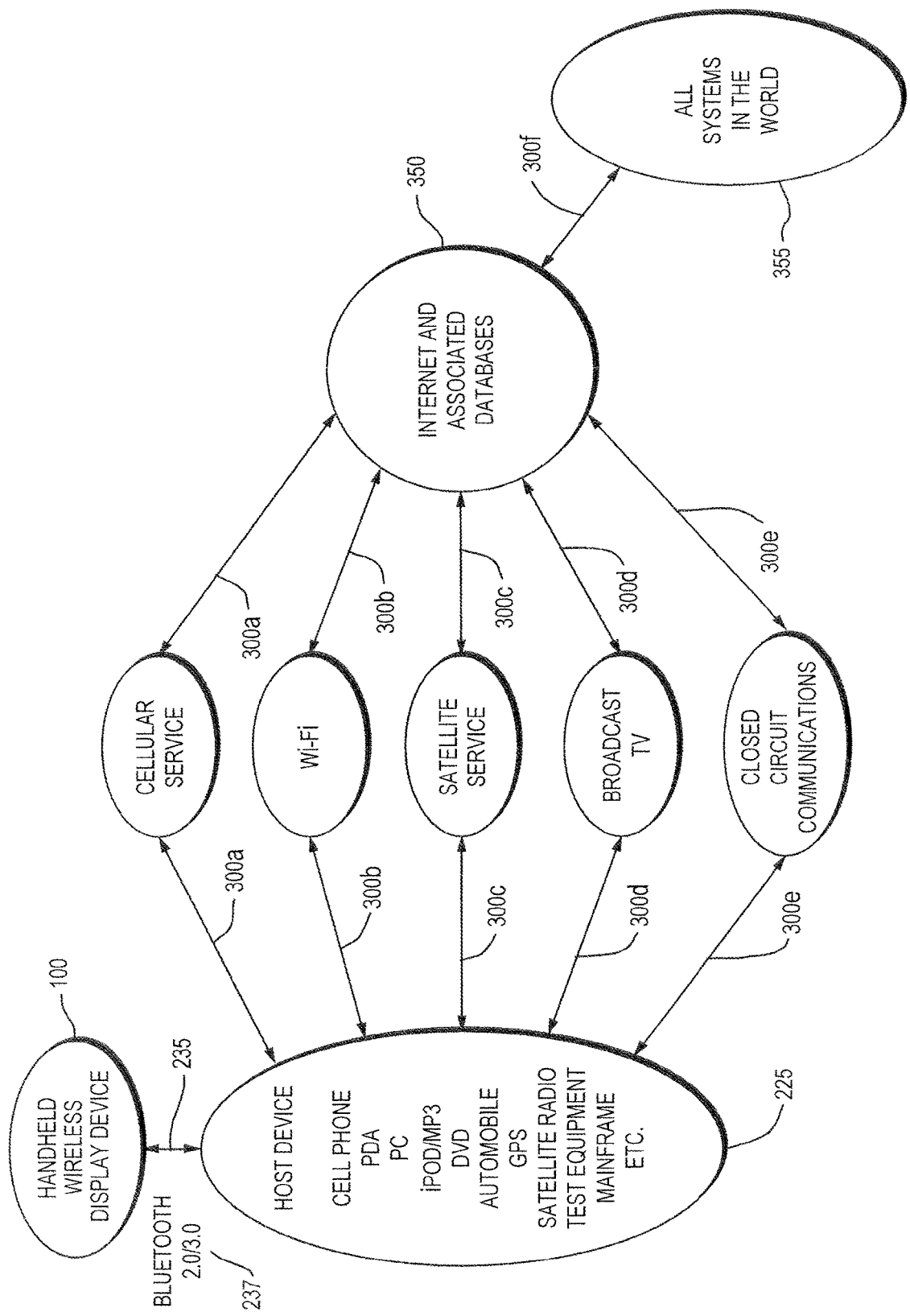
FIG. 3 is a network diagram illustrating communications between an example embodiment handheld wireless display device and host computing devices, and communications between the host computing devices and other external databases and the Internet for delivery of content to the handheld wireless display device.

FIG. 3 is a network diagram illustrating communications between an example embodiment handheld wireless display device 100 and host computing devices 225, and communications between the host computing devices 225 and other external databases and the Internet 350, for delivery of multimedia content to the handheld wireless display device 100. The handheld wireless display device 100 preferably has program instructions stored on a memory to form a computer networking master/slave relationship with host computing devices 225 using a communication protocol. Once the master/slave relationship is established, the direction of control is directed from the handheld wireless display device 100 to the desired components. In this manner, the user need not carry heavy secondary components and may simply control those secondary components using the primary handheld wireless display device 100 over a wireless interface.

The host computing device 225 may communicate with remote databases, and may act as an intermediary between the handheld wireless display device 100 and a source of multimedia content, or site, so the user may view multimedia (in the peripheral vision of the wearer) without the associated heavy computing device and network connections associated with obtaining the multimedia content. The host computing device 225 obtains information along a bi-directional communication path(s) such as cellular service 300a, WiFi 300b, satellite service 300c, broadcast television 300d, and closed circuit communications 300e to the Internet 350 or associated databases 355 for which to display content on the microdisplay element 140 of the handheld wireless display device 100.

In one embodiment, the communication path 300a may be a cellular mobile communication wireless path, and each path may be different or the same relative to the remaining bidirectional communication paths 300b through 300e. In one embodiment, the host computer 225 may obtain information using Sprint™ EV-DO Wireless Broadband Connection, and then communicate with the handheld wireless display device 100 using a Bluetooth™ wireless connection 235.

In another embodiment, the communication path 300b may be a WiFi™ communication path, or similar RF signal communication link. The host computing device 225 may communicate with satellite services providers, digital video recorders, broadcast television providers, or closed circuit communication devices using paths 300c, 300d, or 300e, respectively. Paths 300a through 300e may also be associated with a public access wireless hot spot.

Example embodiment handheld wireless display devices 100 may be compatible with NASCAR Nextel Fan View™ to watch closed circuit television of sporting events, and/or kangaroo.tv broadcast devices for displaying closed circuit television events. The present handheld wireless display device 100 may be configured to receive live broadcasts, may receive multiple different broadcast views of sporting events in real time (of the same or different events), statistical information, and audio data.

The host computing device 225 may access a World Wide Web (WWW) server on the Internet 350 along paths 300a, 300b, and obtain information, which is held and displayed to the microdisplay element 140 along communication link 235. In one embodiment, the content may be in a known data format such as, for example, Hyper Text Markup Language (HTML), Extensible Markup Language (XML), Joint Photographic Experts Group (JPEG), Waveform (WAV), Audio Interchange File Format (AIFF), Bitmap (BMP), Picture (PICT), Graphic Interchange Format (GIF), and Windows Media Video (WMV), or any other data format suitable for multimedia content including streaming video, and audio. The content may be obtained from the Internet from databases 355 along path 300f. Various communication path configurations are possible and within the scope of the present disclosure.

The host computing device 225 may send and receive data along a wireless communication path 300b to the Internet and other system web pages or information databases 350 using HTML along bidirectional communication path 300b. The host computing device 225 may include Internet browsing software (such as known web browsers including, Microsoft Internet Explorer™, Opera™, Netscape Navigator™, and Mozilla Firefox™) to send and receive data along paths 300*a* and 300*b*. The host computing device 225 may be connected to the Internet by a cellular telephone network, and/or an Internet Service Provider Gateway Server.

Moreover, the handheld wireless display device 100 may be configured to receive push e-mail, pull e-mail or periodically forwarded e-mail from e-mail accounts, such as, for example MSN™ Hotmail, Google™ G-Mail, Yahoo!™ mail, AOL™ Mail, or any other e-mail provider or Internet site known in the art along path(s) 300*a* through 300*e*. In one embodiment, the wireless link 235, or communication paths 300*a* through 300*e*, may be compatible for use with a Staccato Communication™ Ultra Wide Band (UWB) USB that includes a RF transceiver, a digital baseband, and an interface to provide for wireless connectivity up to 480 Mbps on a single chip footprint, which may be located in the handheld wireless display device 100, or in the host computing device 225.

Certain host computing devices 225, such as those running a Microsoft Windows™ OS, may recognize the handheld wireless display device 100 as a secondary auxiliary display relative to the primary host computing device 225 primary display. The host computing device 225 may use the operating system to control the secondary handheld wireless display device 100 in a wireless manner.

The handheld wireless display device 100 may wirelessly interface with two or more host computing devices 225, such as a first computing device, and a second computing device, in a substantially simultaneous manner over at least two independent wireless communication paths 235. In this aspect, the handheld wireless display device 100 may synchronize with the first computing device, the second computing device, and other devices so that the handheld wireless display device 100 acts as a central hub.

In this aspect, the handheld wireless display device 100 may initiate a first wireless communication path with the first device and also simultaneously initiate a second wireless communication path with the second device. The first and the second communication paths may be the same or different, and may configured over a Bluetooth™ connection, or a modified Bluetooth™ connection, or another protocol. In one aspect, the communication path may be a Bluetooth™ 2.0 or 3.0 connection, an IEEE 802.11 or IEEE 802.15 wireless communication protocol, and the connection may be suitable to communicate over a number of channels simultaneously with a variable bit rate, and a variable buffer. In an alternative embodiment, the communication path may be a Bluetooth™ connection, and the connection may be suitable to communicate over all channels simultaneously with a variable bit rate, and a variable buffer.

Preferably, using the handheld wireless display device 100, the viewer may control the handheld wireless display device 100 to remotely interrogate a first computing device over a wireless Bluetooth™ connection to pair with the first computing device. Thereafter, the handheld wireless display device 100 may output control program instructions to the first computing device to perform functions at the handheld wireless display device 100.

The handheld wireless display device 100 (while communicating with the first computing device) may also interrogate a second computing device over a wireless Bluetooth™ connection to pair with the second computing device. This may be accomplished using a different or the same wireless interface. Thereafter, the handheld wireless display device 100 may output control program instructions to the second computing device.

Various computer communication configurations are possible and within the scope of the present disclosure, and the handheld wireless display device 100 may be configured to control any number of other computing devices, and/or peripheral devices, such as, for example, a wireless headset, a wireless memory, wireless speakers, etc. For example, the handheld wireless display device 100 may independently pair with two cell phones simultaneously. In this manner, the wearer may make independent calls using the two cell phones using program instructions transmitted from handheld wireless display device 100.

Alternatively, the handheld wireless display device 100 may pair with a cell phone and a laptop computer having a wireless modem to make a call using the cell phone using the handheld wireless display device 100, while controlling the laptop computer to play video, which is transmitted over a Bluetooth™ connection to be displayed on device 100. Various configurations are possible and within the scope of the present disclosure, and the handheld wireless display device 100 may control three or more devices, or more by establishing more than one wireless communication link.

Figure 4:
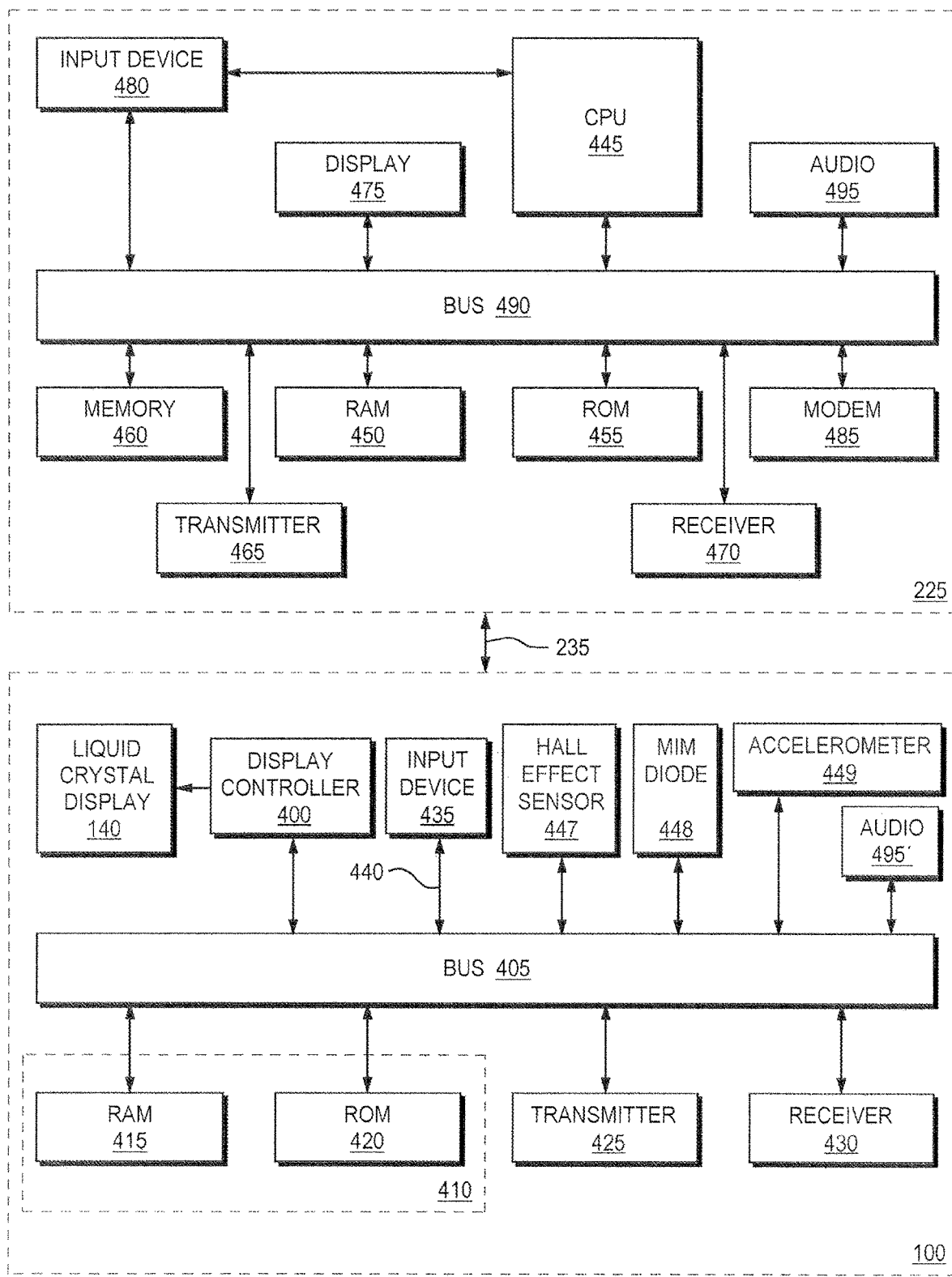
FIG. 4 is a simplified schematic block diagram illustrating internal components of an example embodiment handheld wireless display device and a host computing device adapted to wirelessly transmit data over a bidirectional communication path.

FIG. 4 illustrates a simplified block diagram of a non-limiting example embodiment of the present handheld wireless display device 100 and an example host computing device 225. The handheld wireless display device 100 includes a microdisplay element 140 connected to a display controller 400, which may be a digital signal processor made by Intel™, Freescale Semiconductor™, or Advanced Micro-Devices (AMD)™. The controller 400 is connected to a bus 405, such as a Peripheral Component Interconnect (PCI) bus. In one embodiment, the microdisplay 140 alternatively may be connected to a video graphics card (not shown) which is connected to the bus 405. The video graphics card may be an Accelerated Graphics Port (AGP) video card that fits to an AGP video card slot in the handheld wireless display device 100.

The handheld wireless display device 100 also includes memory 410, such as a random access memory (RAM) 415 and a read only memory (ROM) 420, which saves executable program instructions and communicates the program instructions to the controller 400 through bus 405. Preferably, the handheld wireless display device 100 further includes a transmitter 425 and a receiver 430, and/or a combined transceiver (not shown), both of which are connected to the bus 405 to form a wireless interface with the host computing device 225. The transmitter 425 and receiver 430 also are connected to the display controller 400 over the bus 405 and receive instructions for control thereof.

The handheld wireless display device 100 also includes an input device 435 which may be a wireless mouse, trackball, or keyboard, other similar wireless device that may be wirelessly connected to the PCI bus 405 by a wireless link 440, which is received by the receiver 430. Similarly, lateral movements along and rotational gestures around the X, Y and Z axes may be detected by Hall effect sensors 447, MIM diodes 448, acclerometers 449 or other sensors/transducers. Alternatively, the input device 435 may be connected in a wired manner (not shown) to the bus 405 to provide an input signal to the controller 400. The input device 435 may control screen prompts on the handheld wireless display device 100, the host computing device 225, or both, with the handheld wireless display device 100 and the host computing device 225 in a master/slave networked relationship.

The host computing device 225 includes a central processing unit (CPU) 445, a memory having a RAM 450, a ROM 455, and also including a cached memory 460. The host computing device 225 further includes a transmitter 465 and receiver 470, and/or a combined transceiver (not shown). The host computing device 225 may also include a primary display 475 and an input device 480 which are both connected to a bus 490, such as a PCI bus. The bus 490 also may be connected to a wired broadband connection (not shown), wireless broadband connection 485, DSL line, cable modem, media player, music or video player, or any other suitable link to receive content.

Display controller 400 outputs control signals to the display 140 to display images. This allows the handheld wireless display device 100 to receive data stored on the cache memory 460 of the host computing device 225. When the host computer 225 is not in use, or switched off, the data viewed on the handheld wireless display device 100 is from the cached memory 460, and not updated. This data may be slightly older and not refreshed through the communication links 300a through 300e, as compared with when the host computing device 225 is operational. The handheld wireless display device 100 and the host computing device 225 also may include audio devices 495, 495' that receive a control signal and play audio in response thereto.

Alternatively, as will be discussed below in greater detail with reference to FIGS. 7 and 8A-8C, in a further example embodiment, the handheld wireless display device 100 may access the host computing device 225 across the wireless communication link 235 when the host computing device 225 is on, off, or in a reduced power state, such as a sleep or hibernate state. In this embodiment, the host computing device 225 operates at minimal power and periodically scans for an impromptu, spontaneous wake-up call or command from the handheld wireless display device 100 to trigger a low-level command in the host computing device 225 to wake up the host computing device 225 and provide content or services to the handheld wireless display device. The host computing device 225 may be configured with a predetermined input/output (I/O) port to be monitored for a wake-up call or command that triggers the low-level command to wake up the host computing device 225. Ports include an Ethernet port or card, a WiFi™ port or card, a cellular port or card or a Bluetooth™ port or card suitable for wireless communication across the wireless communication link 235. This port is also known to the handheld wireless display device 100 so that the wake up command may be sent properly to and received by the host computing device 225.

Any external hardwire or external wireless interface may be accessed to permit a Microsoft Windows SideShow™ gadget to access data from the hibernating host computing device 225. The host computing device 225 listens for a specific address number, name or command directed specifically to the hibernating host computing device 225 to wake-up. Receipt of the command at the host computing device 225 triggers a low-level command to wake the host computing device 225. Once awake, the host computing device 225 furnishes any and all information and services requested by the handheld wireless display device 100.

When the transfer is finished, the handheld wireless display device 100 may transmit a command over the wireless communication link 235 to the host computing device 225. Upon receipt of that command, the Microsoft Windows SideShow™ gadget running on the host computing device 225 triggers a system-level command to cause the host computing device 225 to reenter hibernation, for example, until needed again later. Other reduced power states may be triggered, including sleep and off.

The handheld wireless display device 100 may provide many benefits to a user by taking advantage of the capabilities of Microsoft Windows SideShow™. Use of a Microsoft Windows SideShow™ gadget running on the host computing device prevents a user from having to carry a PC 225, for example, around when mobile or traveling. A user whose PC 225 was running the Microsoft Windows SideShow™ gadget may remotely and spontaneously contact their PC 225 from anywhere, thereby instantly receiving the host computing device 225 information content and services needed, and then return their PC 225 to a hibernation state, as will be discussed below with reference to FIGS. 7 and 8A-8C.

Further, the handheld wireless display device 100 allows large facilities to reduce their computer and accessory power consumption by allowing users to not have to leave computers running when not attended while still providing their users immediate access to all or the PC information, computing services and their normal access to company computer resources at user demand. It also reduces general PC maintenance, repair and even damage during travel. Moreover, a reduction in running unattended PCs allows large facilities to reduce air-conditioning power requirements to cool un-attended PCs and allows unattended PCs, even many servers, to be placed in hibernation until the moment they are required.

The handheld wireless display device 100 also allows PC users to no longer have to wait for their PCs to boot-up (e.g., 5-10 minutes per boot-up cycle is not unusual). Whether the PC is in near proximity to the user (e.g., <30 feet) and accessed from hibernation by a Bluetooth™ wireless command, WiFi™ command or over a greater distance by cellular wireless command or even over the Ethernet interface, the PC is hibernating and ready to spring into action when called upon by the user. For example, after a PC is booted in the morning of a work day or just prior to taking a trip, the PC may remain in a hibernating mode and not have to be booted again, until absolutely necessary or desired by the user.

Further, a PC user may use the Microsoft Windows SideShow™ gadget to provide remote access to storage, contents, applications and services of the host computing device, and may operate remotely without requiring user interaction with the host computing device through protocols, such as Remote Display Protocol (RDP) and Virtual Network Computing (VNC), and commercial services, such as GoToMyPC.

Figure 5:
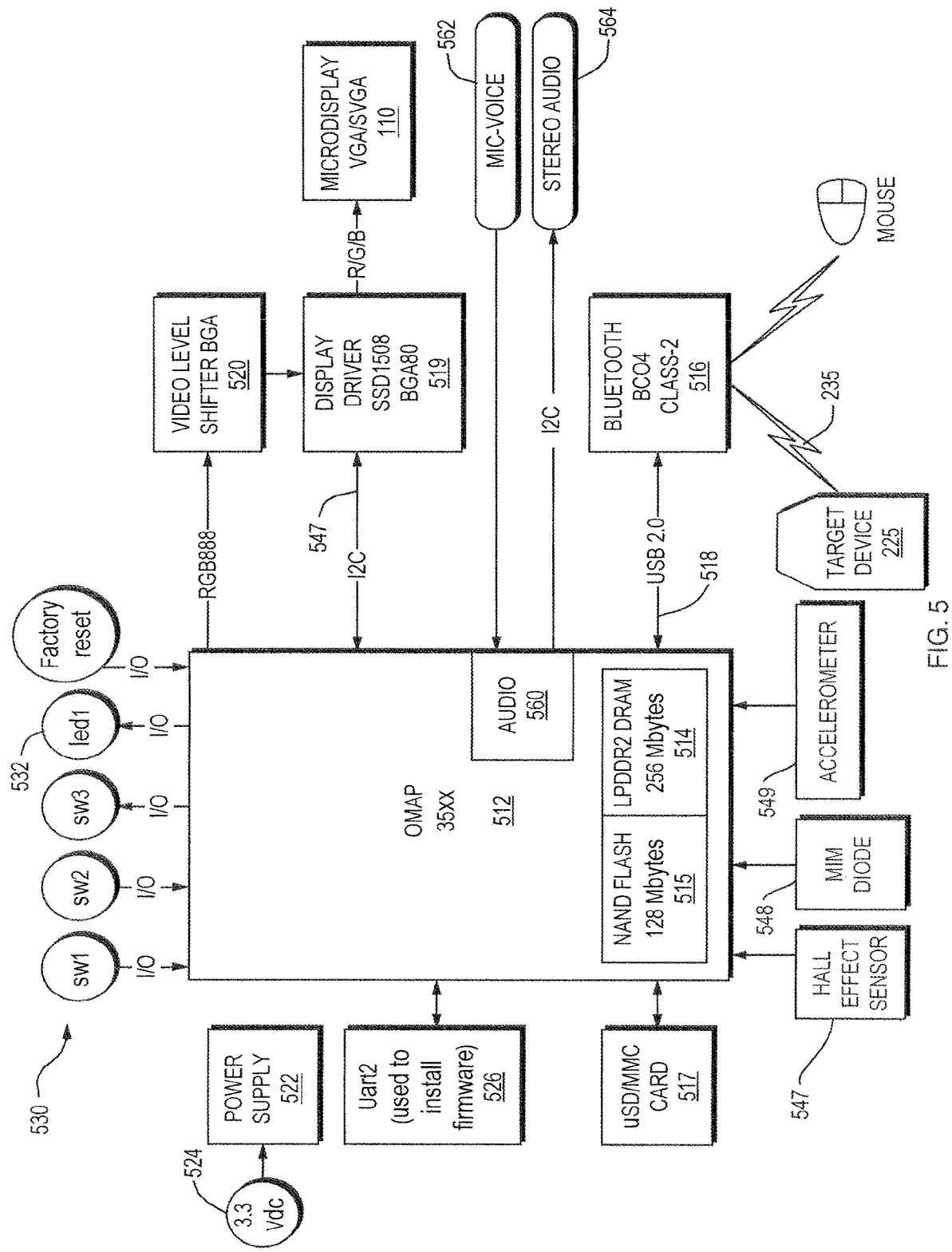
FIG. 5 is a detailed schematic block diagram illustrating internal components an example embodiment handheld wireless display device to receive a content over a Bluetooth™ connection.

FIG. 5 provides a more detailed view of the electronic components incorporated into the handheld wireless display device 100, which is connected to host computing devices 225 to receive a digital video signal over a Bluetooth connection. These components are described in greater detail in a co-pending patent application U.S. application Ser. No. 12/348,627, filed on Jan. 5, 2009, entitled Method And Apparatus For Transporting Video Signal Over Bluetooth Wireless Interface, which is incorporated herein by reference.

In the preferred embodiment, the handheld wireless display device 100 includes an Advanced Reduced instruction set computer (RISC) Machine (ARM)/Digital Signal Processor (DSP) 512 (which may be an Open Multimedia Application Platform (OMAP) 3500 series processor, available from Texas Instruments of Dallas, Tex.), memory 514, Bluetooth interface 516 which may be provided by a Class 2 Bluetooth interface available from Cambridge Silicon Radio (CSR) of Cambridge, England), display driver 519 (which may, for example, be an SSD1508 display driver available from Kopin Corporation of Westborough, Mass.), video level shifter circuits 520, a power supply 522 supported by a battery 524, universal receiver transmitters (UART) 526 (such as may be used for debugging) and memory 515. A Secure Digital (SD), eXteme Digital (xD), USB SD (uSD) memory 517 or other similar interfaces may be used to store application programs, kernel directives, or configuration data, and/or connect to devices such as a digital camera. A number of input device 530 may be associated with the device (e.g., switch 1/switch 2/switch 3 and reset inputs), Hall effect sensors 547, MIM diodes 548, accelerometers 549, track pads and scroll wheels, and an LED output 532 (led 1). A VGA or better quality microdisplay element 140 and audio input and output device(s) 560, which may include microphone input 562 and stereo outputs 564, are also provided.

The signal may be sent over the Bluetooth™ wireless communication link 235 established using Serial Port Profile (SPP) from the handheld wireless display device 100 to the host computing device 225, as opposed to using any of the "advanced" Bluetooth modes, which provides greater throughput higher than the higher layer protocols imposed by such advanced modes that have been found not to be needed in this application. In the Bluetooth™ radio 516, a video signal received over the Bluetooth™ connection is sent over the USB connection 518 to the processor 512. One design consideration is to optimize data packet format, given known data buffer sizes. Internal to the Bluetooth™ radio 516 is a packet buffer default size of 1000 bytes. This may be modified to force streaming video signals to use only about a 990 byte buffer size. The processor 512 may expect the received video content to be encoded with the H.264 (Motion Picture Experts Group (MPEG)-4 part 10) formatting, using the so-called baseline profile or better.

In a preferred embodiment, the processor 512 may use a multi-tasking embedded operating system. The processor 512 operates on the received video signal as follows. An MPEG format container file (e.g., a .MP4 file) is made available. In one preferred embodiment, this may be a proprietary file format, although the specific details of the input .MP4 file format chosen are not important here, as long as the processor 512 is programmed to correctly process it. The processor 512 then opens a communication port to the host computing device 225 and receives the file over the USB interface 518 from the Bluetooth™ radio 516.

An MP4 decoder in the processor 512 strips the file into respective audio and video streams. More particularly, the processor 512 decodes the input file H.264 compressed digital video signal into a YCbCr baseband component video signal. The processor 512 may also divide the associated compressed audio (formatted as an Advanced Audio Coding (AAC) format signal) into baseband stereo audio.

The processor 512 may output video in any suitable format such as an 8 bit, International Telecommunication Union Radiocommunication Sector (ITU-R) Recommendation BT. 656 or Society of Motion Picture and Television Engineers (SMPTE) 293M 16 bit YUV progressive scan signals with separate sync signals, to the display driver 519. The decompressed video signal is forwarded over an internal ARM bus of the processor 512. The ARM bus then sends the content directly to the display driver 519 via the SMPTE 293M interface. The Intelligent Interface Controller (I2C) interface 547 is used to configure the microdisplay element 140. The processor 512 also outputs the baseband audio to the audio output Compression/Decompression Module (CODEC) 560. It may take mono or stereo audio input and produce suitable stereo output signals.

Figure 6:
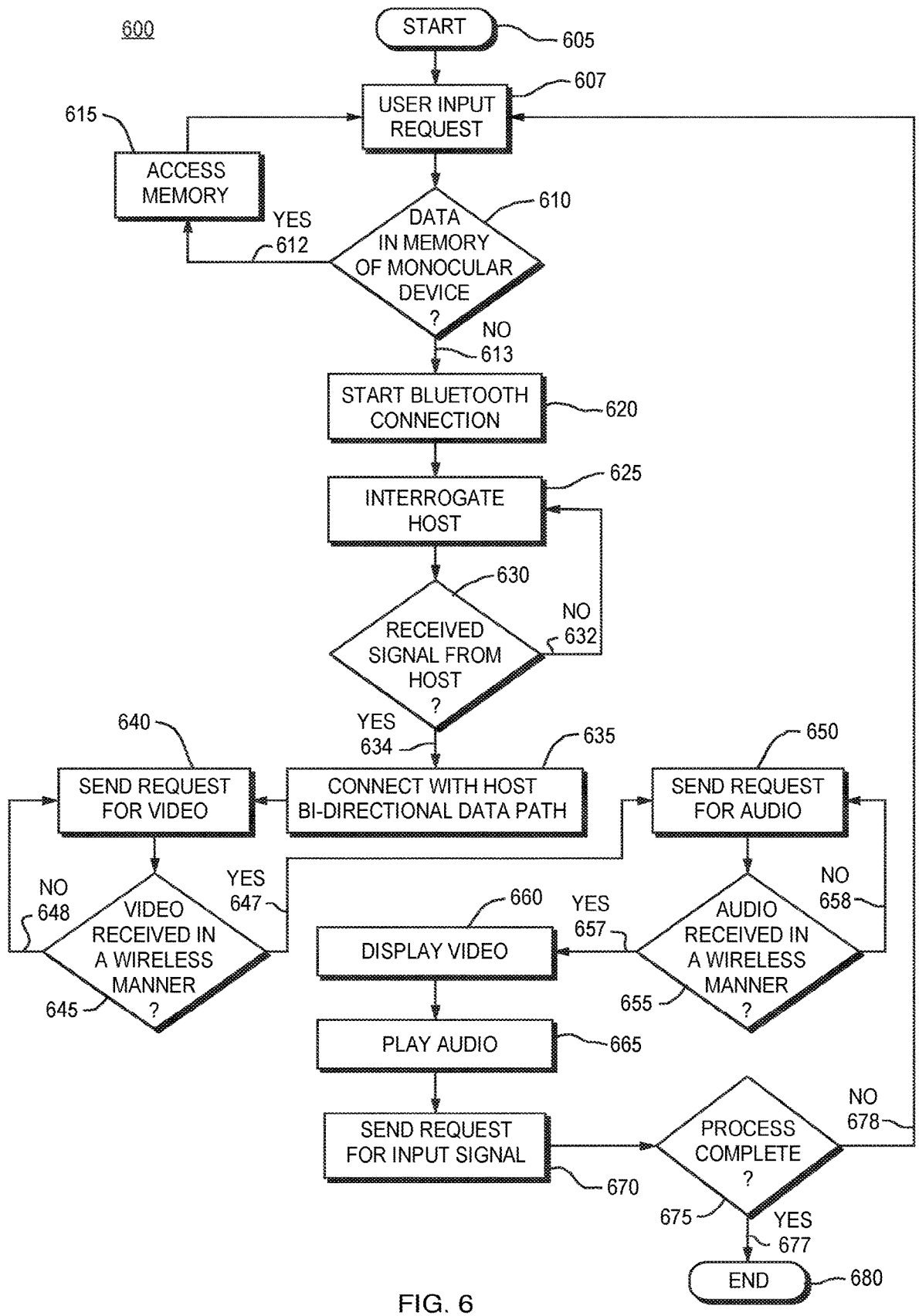
FIG. 6 is a flow diagram illustrating a method of operation of an example embodiment handheld wireless display device.

FIG. 6 is a flow diagram of a method 600 of operation according to an embodiment of the handheld wireless display device. The method commences (605). Thereafter, the handheld wireless display device awaits (607) a user input request. This input may be any signal output from an input device, such as, for example, an output generated by user movement of the handheld wireless display device as detected by MIM diodes, Hall effect sensors or accelerometers, or from a wireless trackball, a wireless mouse, or a wireless key pad, or a button located on the housing of the handheld wireless display device.

In one embodiment, using an operating system, such as, Microsoft Windows Mobile™ operating system, and using a gesture, the user may double click an icon on the handheld wireless display device screen (e.g., microdisplay element 140 of FIG. 1) to indicate to open an electronic mail message, or to open an application. Thereafter, the method 600 attempts to receive data from a source of content, in response to the request, and the method determines (610) whether the content source is located in a memory on the handheld wireless display device (e.g., memory 410 of FIG. 4), such as, for example, on a camera output, or whether, the source is located at another remote location, such as, on the host computing device (e.g., host computing device 225 of FIG. 2). If the data is indeed stored locally (612) and no wireless link is needed, then the local memory is accessed (615) and the data is configured to be retrieved and loaded for subsequent display on the display element. Once the method 600 accesses the local memory (615), the method 600 returns to wait for a new user input request (607).

However, if the data is located on a remote memory or in a memory not located on the handheld wireless display device (613) then a Bluetooth™ connection, or other previously described wireless connection(s), is started (620) to obtain the data as requested (607). Other wireless communication formats may also be used, as previously discussed, and the present method 600 is for illustration purposes only.

The device's transmitter (e.g., transmitter 425 of FIG. 4) may be activated to interrogate the host computing device, and to send an initial configuration signal to the receiver (e.g., receiver 470 of FIG. 4) of the host computing device (625). The host determines whether the Bluetooth™ signal is sufficiently powered and was received from the handheld wireless display device 100 (630). Once the signal is received, the host transmitter (e.g., transmitter 465 of FIG. 4) sends a confirmation signal to the handheld wireless display device receiver (e.g., receiver 430 of FIG. 4) using a second predetermined signal. If the signal was not received (632), then the handheld wireless display device continues to interrogate the host (625). A stronger or more directive signal is sent. If the signal is received correctly by the host computing device (634), then a bi-directional communication data path is formed across the wireless link (e.g., wireless link 235 of FIG. 3) (635). Uplink and downlink signals may be communicated across the bidirectional connection data path to and from the devices (e.g., handheld wireless display device 100 and host computing device 225 of FIG. 3), the present method being merely illustrative as various diagnostic, utility applications and signals that may be sent along the wireless link in addition to the nonlimiting method of FIG. 6.

Once the bi-directional communication data path is formed (635), multimedia data files may be communicated from the host computing device to the handheld wireless display device. In one non-limiting embodiment, the bandwidth of the communication path is sufficient in bits per second (bps) that, when operating Microsoft Windows Vista™ Operating System at the host computing device, the graphical output of the host display output screen (e.g., host display 475 of FIG. 4) is visible in real time at the microdisplay element (e.g., microdisplay element 140 of FIG. 4), such that if both displays were held side by side, a cursor movement occurs on both screens substantially simultaneously to enable remote operation of the host computing system at the handheld wireless display device.

The display controller (e.g., controller 400 of FIG. 4) sends a request for a video signal from the computing device (640). The request is communicated to the bus 405, and to the transmitter and then sent across the link. Thereafter, the handheld wireless display device determines whether the video signal was received from the host computing system in a wireless manner (645). If the signal was received wirelessly (647), then the handheld wireless display device requests audio (650). If the signal was not received in a wireless manner (648), then the handheld wireless display device returns to send another request (640).

The display controller sends a request for an audio signal from the host computing device (650). The audio and the video signal may be sent as one continuous signal and the present disclosure is not limited by any such two signal embodiment. The request is communicated to the bus (e.g., bus 405 of FIG. 4), to the transmitter, and then sent across the link. The handheld wireless display device then determines whether the audio signal was received from the host computing system in a wireless manner (655). If the audio signal was wirelessly received (647), then the handheld wireless display device displays video (660). If the audio data or signal was not received wirelessly (648), then the handheld wireless display device returns to send another request (650).

Program instructions cause the handheld wireless display device to display video on the microdisplay element by the display controller (660) and play audio using the audio device (e.g., audio device 495 of FIG. 4) (665). Thereafter, a request for a further input signal is sent (670). It is then determined whether the process is complete (675). If the process is complete (677), then the method ends (680). If the process is not complete (678), a further user input request is awaited (607). Various control configurations are possible and within the scope of the present disclosure, and the present configuration is for illustration purposes only, and multiple other steps for encryption, and to decipher host computing or other external computing device formats may be carried out.

Figure 7:
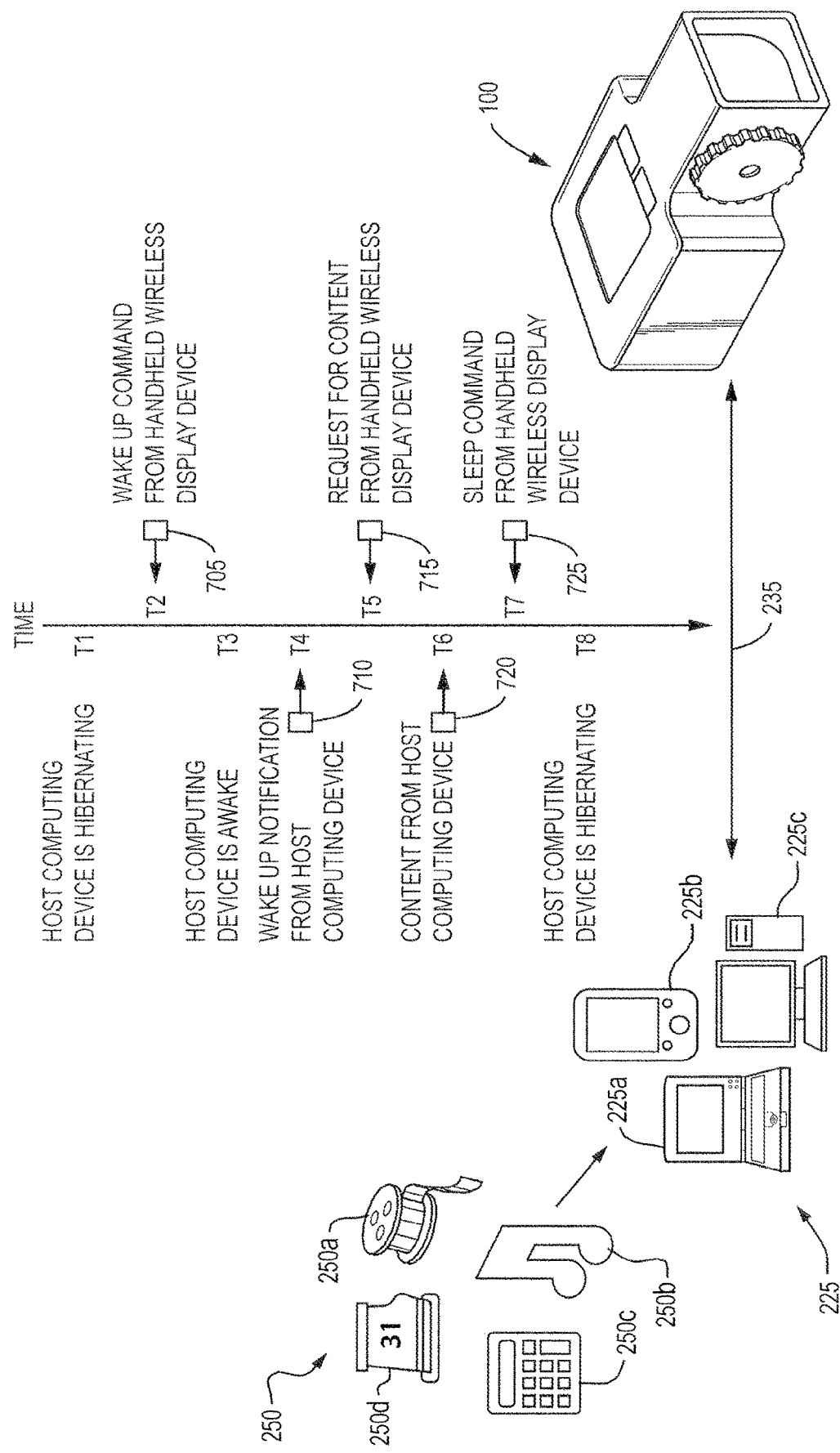
FIG. 7 is a diagram illustrating an example embodiment handheld wireless display device, a host computing device, and communications between the handheld wireless display device and the host computing device to wake the host computing device from a hibernating reduced power state, provide content to the handheld wireless display device, and return the host computing device to the hibernating reduced power state.

FIG. 7 is a diagram illustrating an example embodiment handheld wireless display device, a host computing device, and communications between the handheld wireless display device and the host computing device to wake the host computing device from a hibernating reduced power state, provide content to the handheld wireless display device, and return the host computing device to the hibernating reduced power state.

During an initial stage of operation, a bi-directional wireless link 235 is established between the transmitter of the handheld wireless display device 425 and the receiver of the host device 470 and an authentication process occurs across the wireless communication path 235. Thereafter, the handheld wireless display device 100 may wirelessly communicate with the host receiver 470 over a wireless communication link 235, and the host transmitter 465 may transmit signals to the handheld wireless display device receiver 430. In one embodiment, the handheld wireless display device 100, from its transmitter 425, may wirelessly communicate with the host receiver 470 using a Bluetooth™ 2.0 or 3.0 wireless radio frequency standard. In another embodiment, the handheld wireless display device 100 may wirelessly communicate using a wireless Ultra Wide Band communication link 235, or using short-range radio frequency signals 235.

In one non-limiting embodiment, the host computing device 225 executes program instructions and uses a Microsoft Windows SideShow™ gadget to interrogate the handheld wireless display device 100 to allow the handheld wireless display device to access the cached memory of the host computing device 225. The handheld wireless display device 110 then retrieves the cached content from the host computing device 225 to be displayed on the microdisplay element 140 with the host computing device 225 is on, off, or in a reduced power state, such as a sleep or hibernate state.

At time T1, the host computing device 225 is in a reduced power state, such as a hibernating state. During time T1, the host computing device 225 continually monitors a specified port for a wake up command. At time T2, the handheld wireless display device 100 sends a wake up command 705 to the host computing device 225 over the wireless connection 235. After the wake up command 705 is received by the host computing device 225, the host computing device 225 calls a low-level function and enters a full power state to be awake at time T3. At time T4, the host computing device 225 optionally sends a wake up notification 710 to the handheld wireless display device 100. Upon receiving the wake up notification 710, the handheld wireless display device 100 is informed that the host computing device 225 is awake and ready to provide content 250.

At time T5, the handheld wireless display device 100 sends a request for content 715 to the host computing device 225. In response, the host computing device 225 gathers the requested content and, at time T6, sends the requested content 720 to the handheld wireless display device 100. Some time later, at time T7, the handheld wireless display device 100 sends a sleep command 725 to the host computing device 225 to trigger an application, such as a Microsoft Windows SideShow™ gadget, running on the host computing device 225 to cause the host computing device 225 to enter a reduced power state, such as a hibernating or sleep state. In response to the command 725, the application running on the host computing device 225 calls a system-level function to enter the hibernating state. At time T8, the host computing device 225 is hibernating again. This process may happen repeatedly.

Figure 8A:
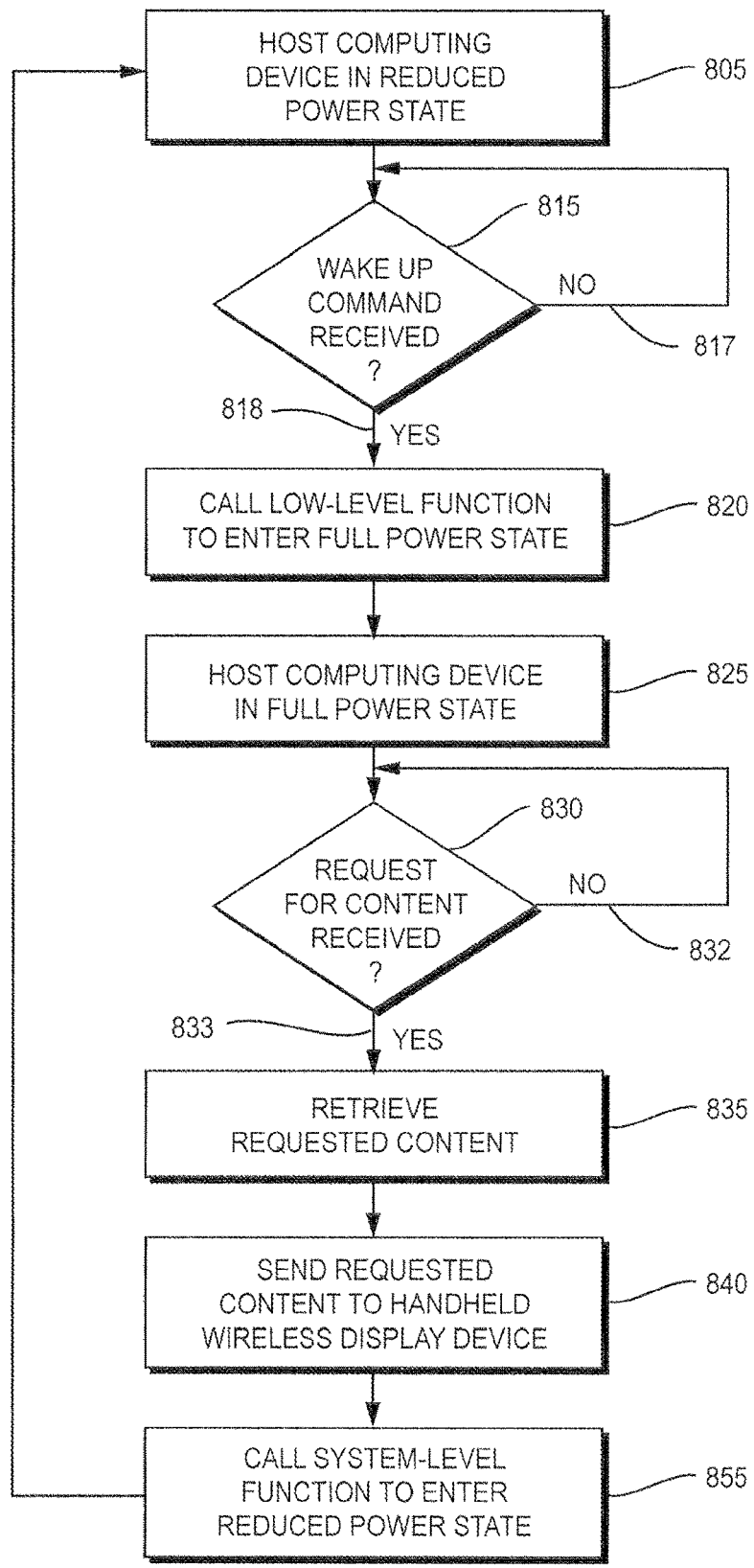
FIGS. 8A-8C are flow diagrams illustrating example methods by which an example embodiment handheld wireless display device may wake a host computing device from a hibernating reduced power state, receive content from the host computing device, and return the host computing device to the hibernating reduced power state.
Figure 8B:
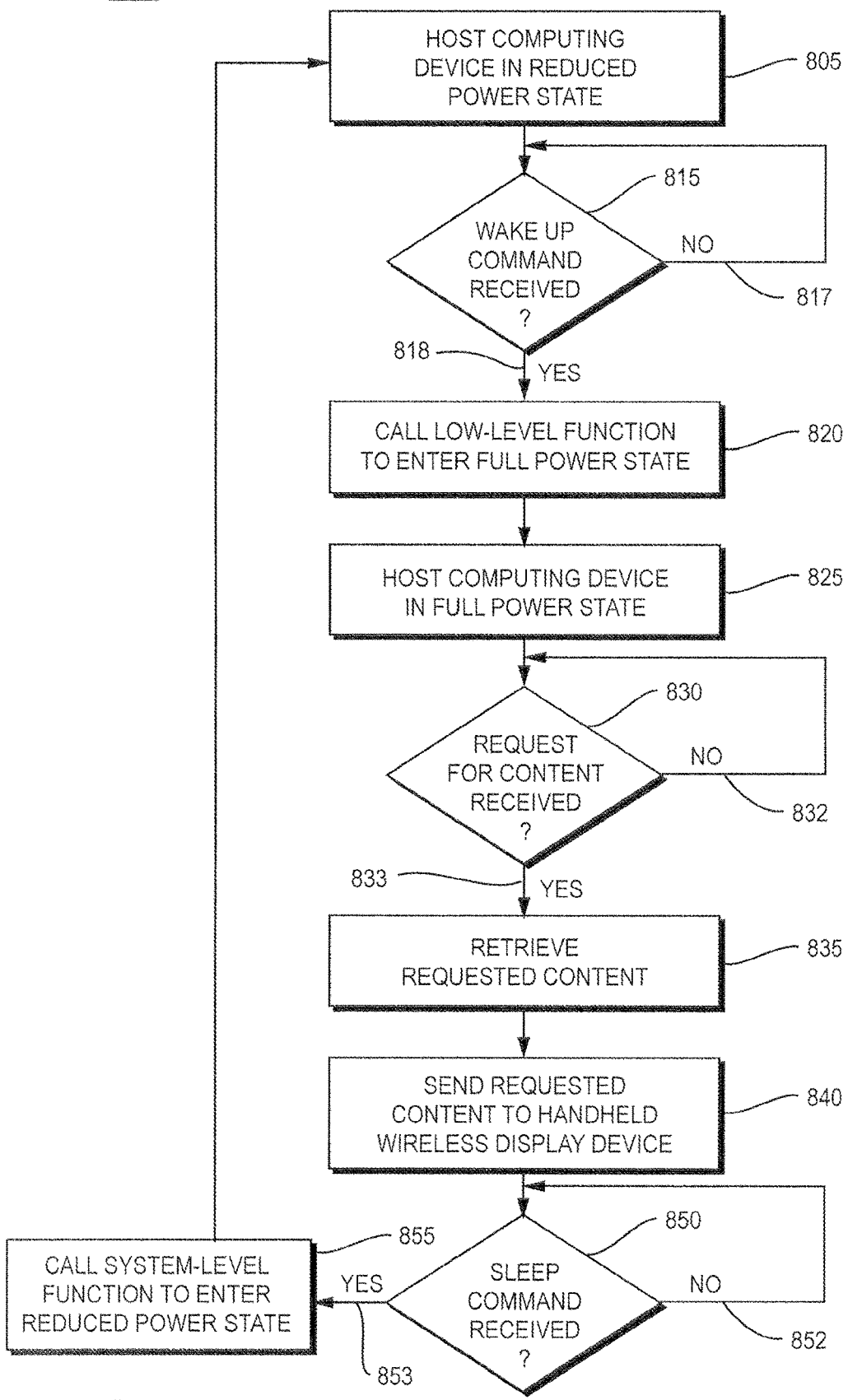
Figure 8C:
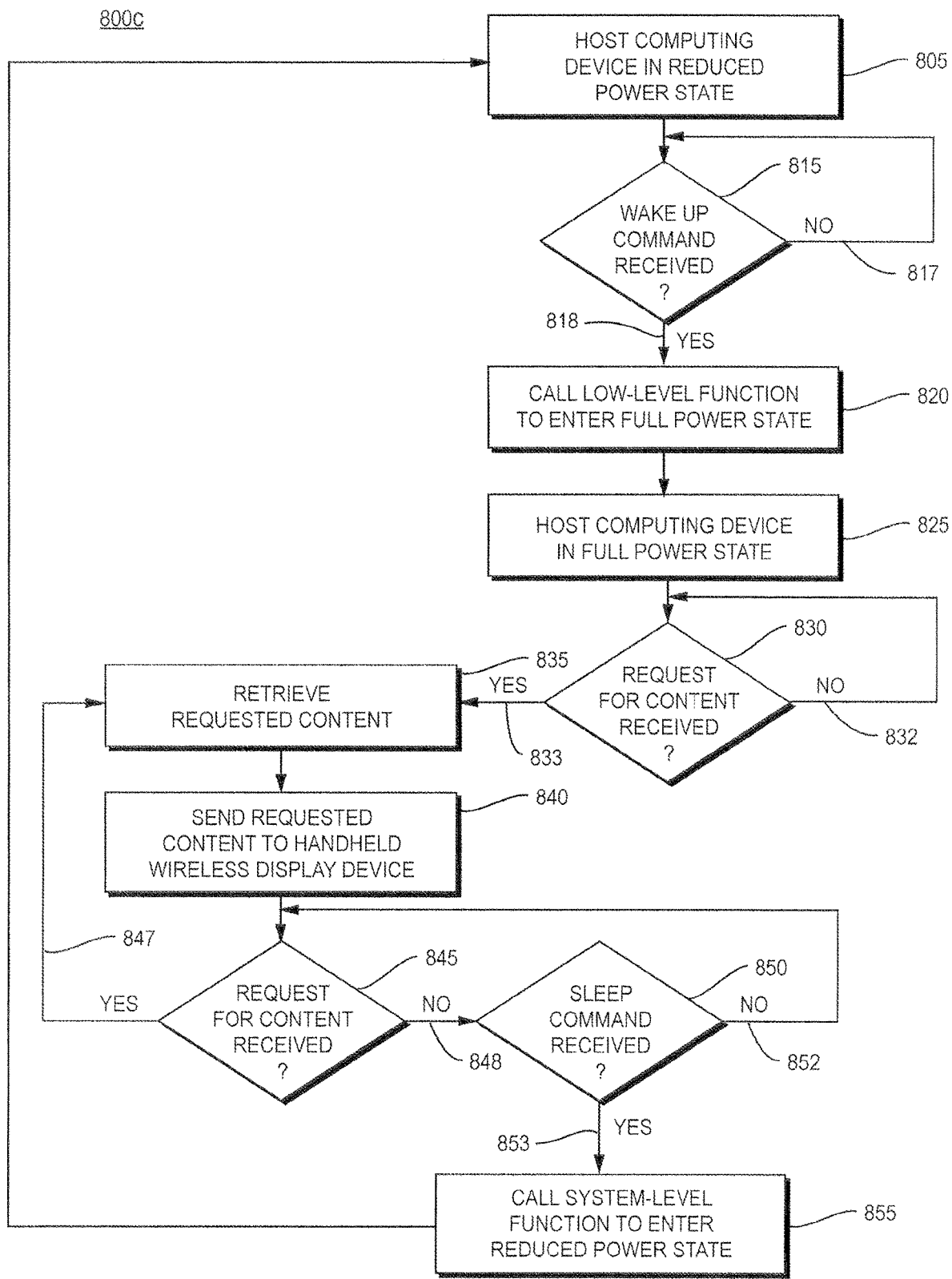

FIGS. 8A-8C are flow diagrams illustrating example methods by which an example embodiment handheld wireless display device may wake a host computing device from a hibernating reduced power state, receive content from the host computing device, and return the host computing device to the hibernating reduced power state.

As illustrated in the flow diagram 800a of FIG. 8A, an example method commences with a host computing device being in a reduced power state (805). As described above with reference to FIG. 7, a wireless connection between the host computing device and a handheld wireless display device (e.g., wireless connection 235 of FIG. 2) has already been established. The host computing device monitors a specified port at intervals for a wake up command from the handheld wireless display device. Such monitoring may be performed by low-level functions of the host computing device, such as those provided by a BIOS or network interface device. The host computing device checks whether a wake up command has been received (815). If a wake up command has not been received (817), the host computing device continues to monitor at intervals. However, if a wake up command has been received (818), the host computing device calls a low-level function to enter a full power state (820).

Once in the full power state (825), the host computing device monitors for a request for content. Such monitoring may be performed by a software application running on the host computing device. The host computing device checks whether a request for content has been received (830). If a request for content has not been received (832), the host computing device continues to monitor for a request for content (830). However, if a request for content has been received (833), the requested content is retrieved by the host computing device (835) (e.g., content 250 of FIG. 2).

The host computing device then sends the requested content to the handheld wireless display device (840). After the requested content is sent, the host computing device enters a reduced power state by calling a system-level function (855). Such a system-level function may be called by the software application running on the host computing device.

Alternatively, as illustrated in FIG. 8B, after sending the requested content to the handheld wireless display device (840), the host computing device may continue to monitor for a command. The host computing device checks whether a sleep command has been received (850). If a sleep command has not been received (852), the host computing device continues to monitor for a sleep command (850). However, if a sleep command has been received (853), the sleep command triggers the host computing device to enter a reduced power state by calling a system-level function (855).

Further, as illustrated in FIG. 8C, not only may the host computing device monitor for a sleep command (850), but the host computing device also may monitor for a command for further content (845). After sending the requested content to the handheld wireless display device (840), the host computing device may continue to monitor for a command. The host computing device checks whether a request for content has been received (845). If a request for content has been received (847), the requested content is retrieved by the host computing device (835) and the method continues as described above. However, if a request for content has not been received (848), the host computing device checks whether a sleep command has been received (850). If a sleep command has not been received (852), the host computing device continues to monitor for a command. However, if a sleep command has been received (853), the sleep command triggers the host computing device to enter a reduced power state by calling a system-level function (855).

Figure 9:
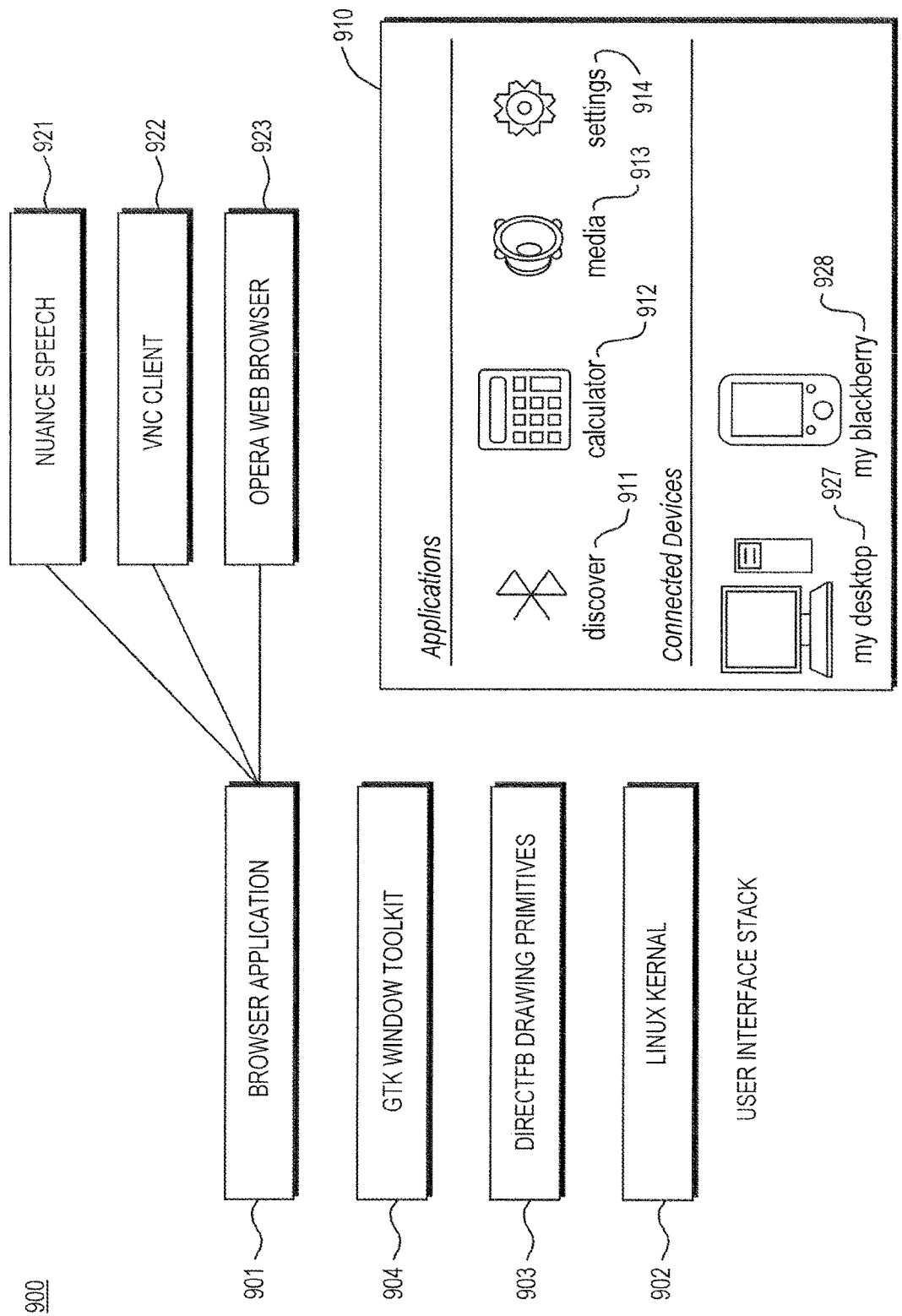
FIG. 9 is a high level software diagram indicating how an example embodiment handheld wireless display device may be used to control and manage various hosts through a user interface.

FIG. 9 is a high level software diagram indicating how the handheld wireless display device 100 may be used to control and manage various hosts 225 through a user interface. A software stack 900 includes a device application browser 901 which may run on top of the kernel of an operating system (OS), such as a Linux kernel 902, drawing primitives, such as those provided by a Direct FB (DirectFB) stack 903, and a graphical tool kit, such as a Gimp Tool Kit (GTK) window tool kit 904. The device application browser 901 allows a user to access application software for handheld wireless display device 100 through an icon and menuing interface. This typically consists of custom code written for the particular handheld wireless display device 100.

The OS 902 is ported to run on the processor in the handheld wireless display device 100, such as the OMAP 3500 series ARM/DSP shown in FIG. 5. The kernel level 902 otherwise provides standard operating system functions.

The drawing primitives layer 903 may be a somewhat thin graphical library that provides for graphic acceleration input device handling and abstraction integrated windowing system. The end result is a graphical user display 910 which has various applications available to the user, such as Bluetooth™ discovery 911, a calculator 912, media player 913 and a settings interface 914.

Applications running within the context of the device application browser 901 may include a speech input 921, a Virtual (Desktop) Network client 922, and a web browser 923. Virtual Network is a system that allows a personal computer (PC) to be controlled remotely. It does this by exporting an entire screen display to another device in the form of a bitmap. This bitmap is wrapped in a network protocol and received by the device and simply displayed. Similarly, any mouse movements or keyboard entry data detected by the local device are passed directly to the remote PC to be acted upon.

The speech command interface 921 provides or allows for voice input commands to control the application browser 901. Thus, for example, a user may say the word "calculator" which is detected by the speech device, which causes the operating system 902 to launch the calculator application. In general, text labels displayed next to on-screen buttons or icons within the context of the application browser indicate a spoken word which activates the corresponding button. Digital inputs (e.g., MIM diodes, Hall effect sensors, accelerometers and switches as illustrated in FIGS. 1B, 1C, 4 and 5) also may be used to navigate and select menu functions allowing for full control and editing of applications and associated data.

Discovery application 911, as will be understood shortly, allows not only for discovery of neighboring Bluetooth™ devices but also connecting them through to the application browser level. For example, shown in the example user display 910 is the fact that there are presently two connected devices, including a desktop computer 927 and a Blackberry™ 928. The devices 927, 928 have been discovered through operation of the discover application 911. This may be, for example, initiated on first power up of the handheld wireless display device 100 or by a user manually initiating a Bluetooth™ discovery process. The Bluetooth™ device discovery proceeds as per the Bluetooth™ specification, reporting any new Bluetooth™ layer devices as they are connected at a physical layer.

At this point, however, additional functionality is provided to permit communication with the Bluetooth™ devices at a network level. In particular, a client 927, 928 is told to open a special port on a local host address that is local to the handheld wireless display device 100. This device port acts as a proxy, always looking for such requests. When a request is received, it reports back an available network level address (i.e., such as a TCP/IP address) to be used by an individual device 927, 928 for network level communication.

Figure 10:
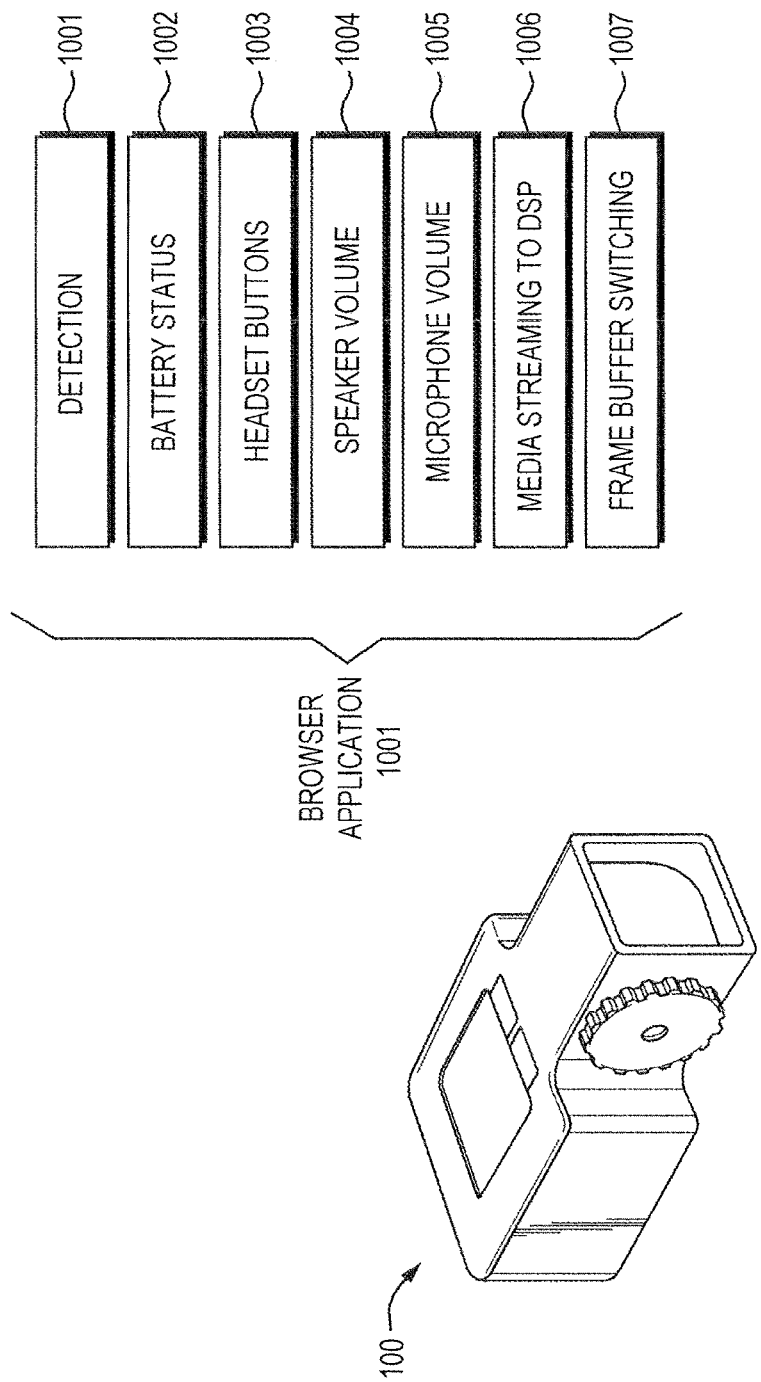
FIG. 10 is a diagram illustrating an example hardware interface of an example embodiment handheld wireless display device.

FIG. 10 illustrates hardware interface functionality also provided by the browser application 901 of FIG. 9 which may receive and/or control various hardware functions on the handheld wireless display device 100. Such functions may include handheld wireless display device detection 1001, battery status 1002, output device adjustment, such as headset button 1003, speaker volume 1004, microphone volume 1005, media streaming functions 1006, frame buffer switching 1007, device drivers, and like functions.

Figure 11:
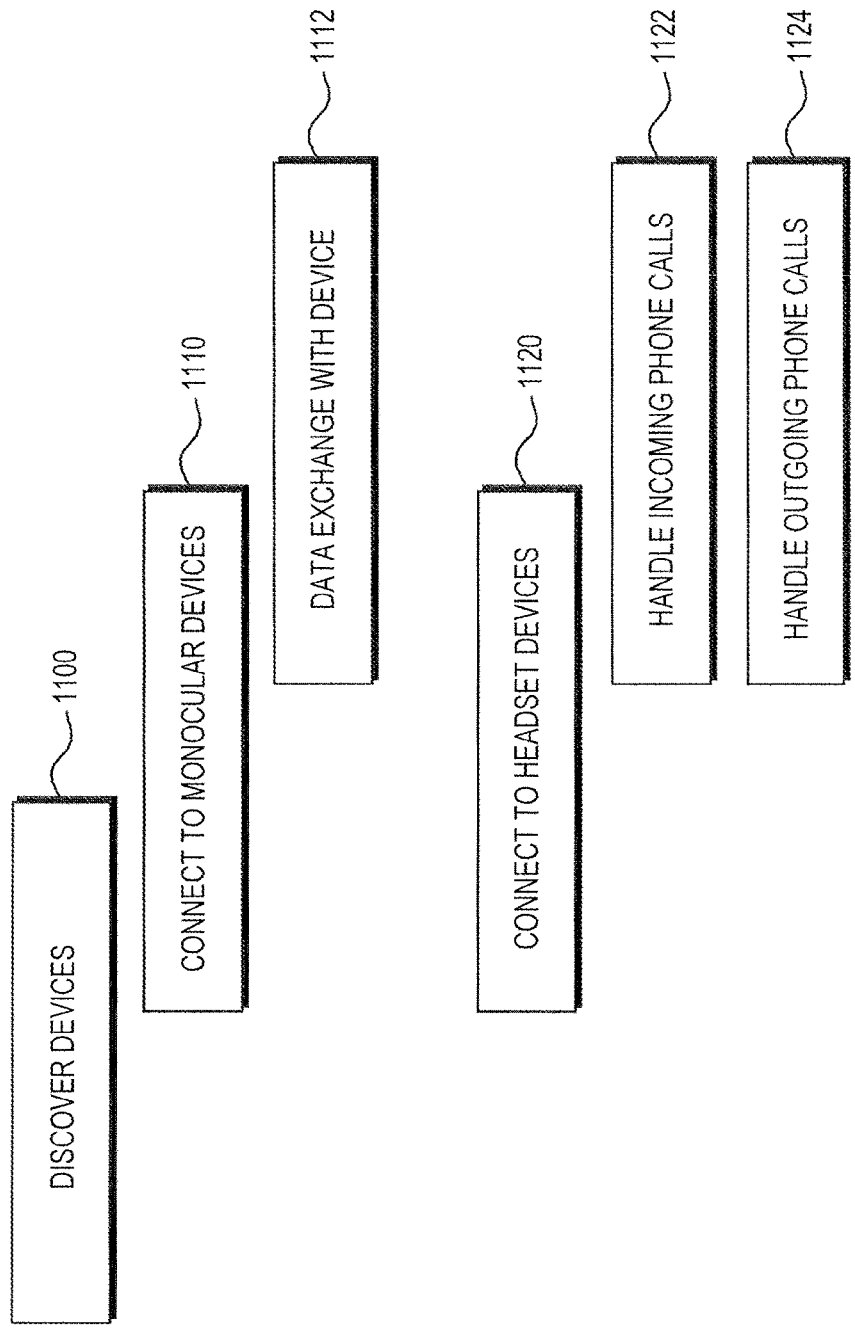
FIG. 11 is a diagram illustrating a Bluetooth™ protocol stack including a proxy function.

FIG. 11 illustrates a Bluetooth protocol stack implemented in the Bluetooth link 237 of FIG. 2, with the addition of a special proxy function. The Bluetooth™ layer does provide for discovery of Bluetooth™ devices 1100 as in any standard Bluetooth™ device. However, handheld wireless display device 100 connected 1110 also provide for protocol information permitting data exchange with such devices 1112. It may also connect to other types of headset devices 1120, such as telephone headset devices which may provide for handling of incoming calls 1122 and outgoing calls 1124.

Figure 13:
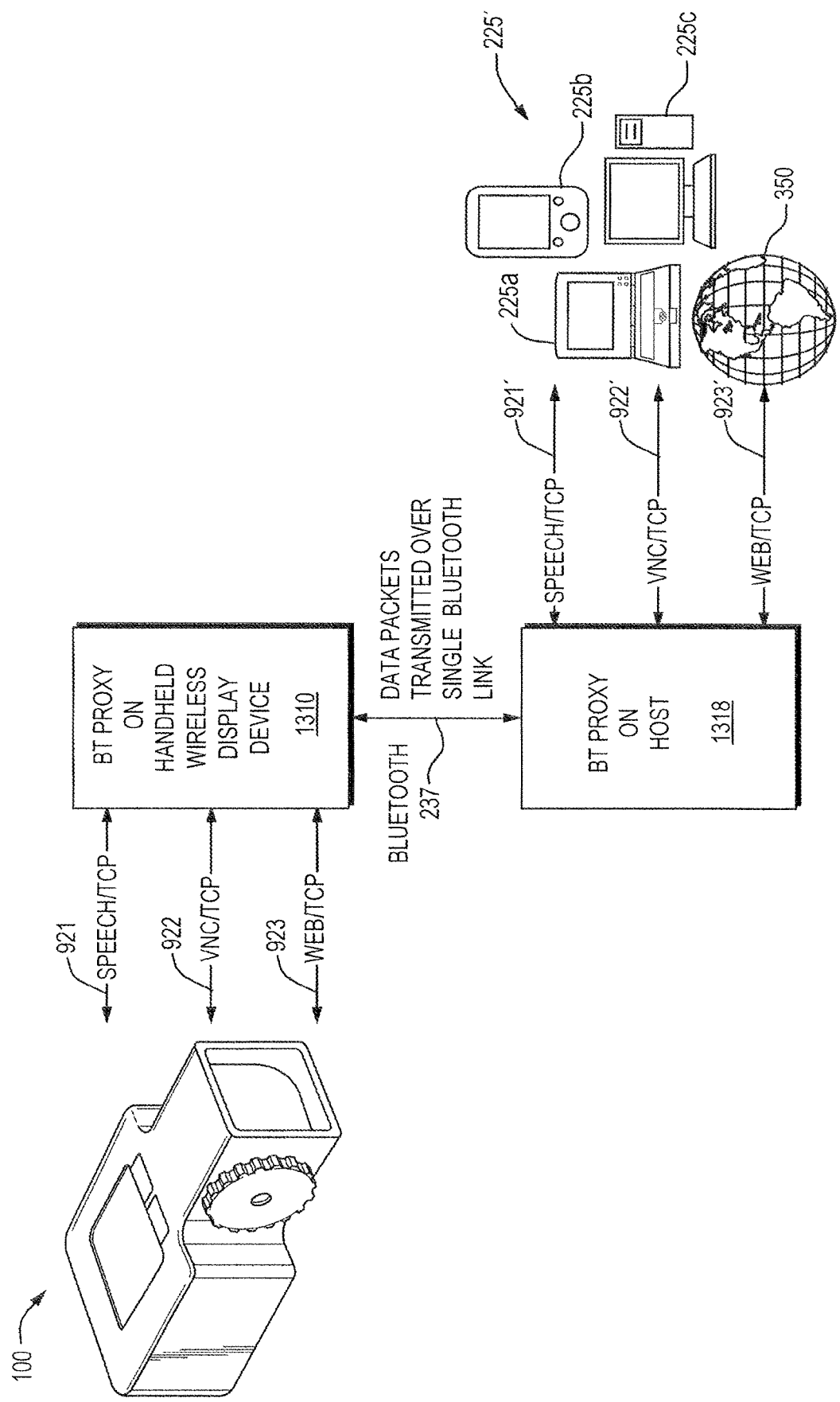
FIG. 13 is a block diagram illustrating a Bluetooth™ proxy for carrying data packets over a bidirectional communication path in greater detail.

FIGS. 12A-12B and 13 show more detail of the proxy functionality provided by the Bluetooth™ interface 237.

FIG. 12A illustrates a traditional approach involving multiple direct TCP-layer connections to data sources. For example, each application running in the context of application browser 901 of FIG. 9, such as a speech recognition application 921, virtual network client 922, and a web browser client 923, might each require one or more TCP connections to the data sources provided by host computing devices 225'. Traditional systems involve multiple direct TCP connections to data sources.

FIG. 12B illustrates how, although Bluetooth™ itself does not provide any direct connection to the Internet 350 or other high layer networks, a connection between the handheld wireless display device 100 and the Internet 350 may be supported by a proxy 1230 via an Internet enabled host computing device 225. Bluetooth™ cannot connect directly to Internet; it must be proxied via an Internet enabled device. Thus, for example, applications such as the web browser 923 typically require host computing devices 225 to act as a networking proxy.

FIG. 13 illustrates a preferred arrangement in which a single Bluetooth™ link 237 supports multiple applications 921-923. The multiple application 921-923 require that the single Bluetooth™ connection 237 support multiple sockets, such as Transmission Control Protocol (TCP) connections. For example, while each application 921-923 might otherwise require multiple TCP connections, instead the Bluetooth™ proxy layer 1310 added between the standard Bluetooth™ layer and regular TCP protocol layer funnels the multiple requested TCP connections onto a single socket. The single socket provided by Bluetooth™ link 237 then transports the multiple connections to the host computing device 225.

A similar inverse functionality 1318 provided on the host computing device side 225 to unravel packets to their respective connection 921'-923'.

While Bluetooth™ itself does allow for multiple connection sockets between a host and client, many mobile phone operators impose a single connection limit. Thus, a single connection limit must be observed in many instances. This permits not only greater security, but avoids the possibility of having a wireless device be swamped with Bluetooth™ connection requests. This approach also permits a standard web browser application 923, for example, to operate without requiring modification to its use of TCP sockets. Thus, the operation of the Bluetooth proxy 1310 provided on the handheld wireless display device 100 and proxy function 1318 provided on the host computing device 225 insulate the applications 921-923 running within application browser 901 and also insulate the applications running on host computing device 225 from such modified socket functionality. For example, a virtual network running on a host computing device 225 now need not be modified.

Figure 14:
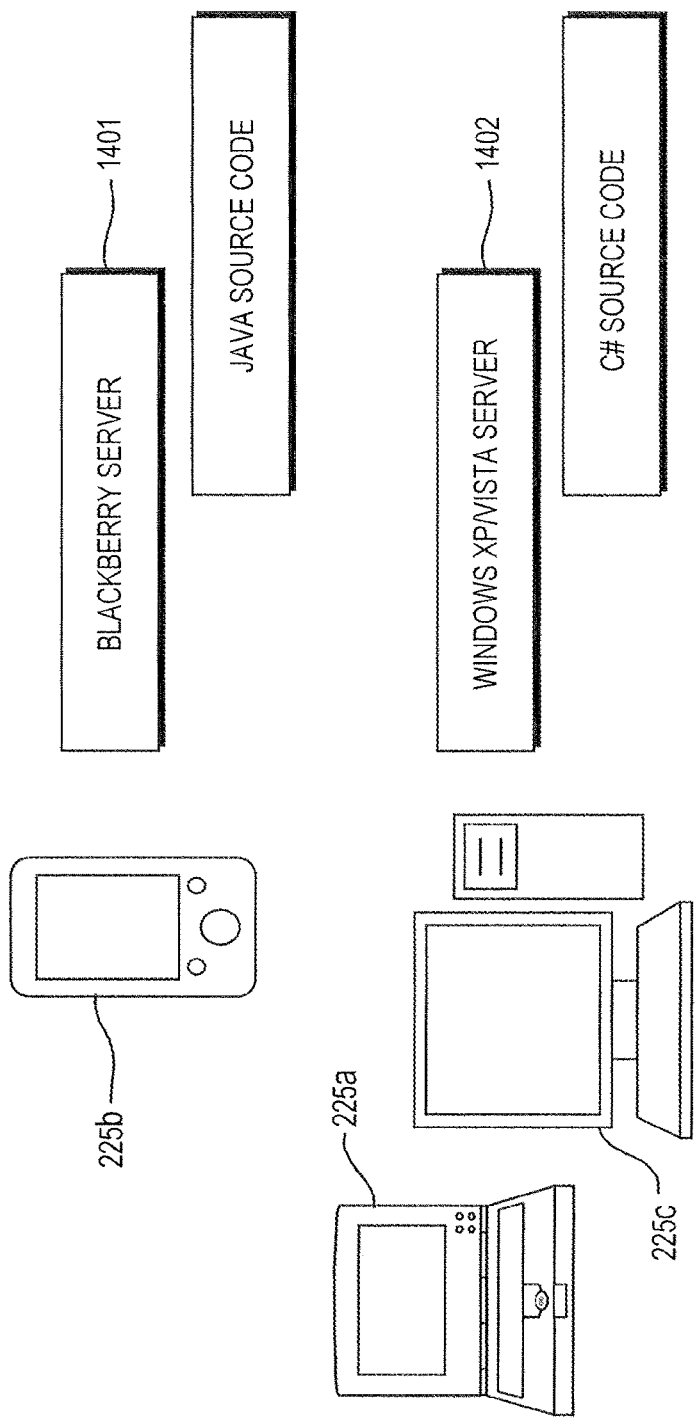
FIG. 14 is a block diagram illustrating device drivers.

FIG. 14 illustrates device drivers provided to insulate the device application browser 901 from having to know specifics of content format for particular host devices. Thus, for example, a Blackberry server 1401 is provided for a Blackberry host 225b, and a Windows Vista server 1402 is provided for a Windows machine host 225c. This allows the user interface specifics for particular hosts computing devices 225 to be presented as a generic interface to the handheld wireless display device 100. The servers 1401, 1402 provide at least two functionalities, including the Bluetooth™ proxy functionality 1318 of FIG. 13 (i.e., unpacking TCP channel data into multiple required channels) and a content server.

Figure 15:
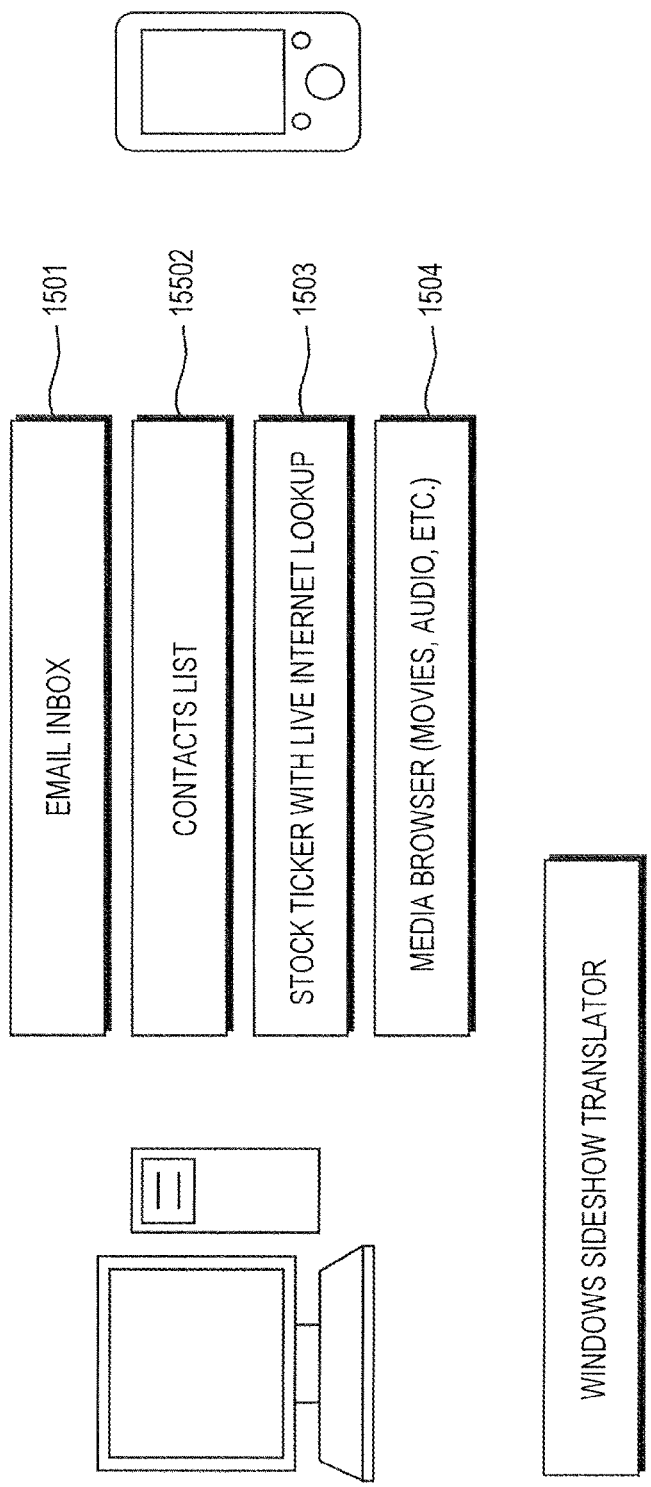
FIG. 15 is a block diagram illustrating device content.

FIG. 15 illustrates processing of device content by the servers 1401, 1402 of FIG. 14. These may include a content format piece for each type of respective content including email inbox 1501, contact list 1502, stock ticker 1503, media browser 1504 and the like. Each of these server functionalities 1501-1504 reformats its content using a page markup language. The page markup language may then be interpreted by the content browser 901 on the handheld wireless display device. The content browser 901 may now interpret the page markup language generically to fit the various requirements of the handheld wireless display device 100.

In alternate embodiments, a function such as a Microsoft Windows SideShow™ may take formatted content from a Windows device and format it according to SideShow requirements. Microsoft Windows SideShow is a technology introduced with the Windows Vista release of the Microsoft™ operating system that enables Windows PC to drive a variety of auxiliary display devices connected to a main PC. These devices may be separate from or integrated in to the main PC, for example, and display embedded on the outside of a laptop lid, etc.

With the virtual network and/or Microsoft Windows SideShow™ functionality, the handheld wireless display device 100 may also become a "chameleon", in effect taking on the same user screen, same graphical user interface, and familiar user control of the host computing device 225. Even if the handheld wireless display device 100 accepts several host computing devices 225 at the same time (i.e., a blackberry, a cell phone, and a PC), a user is permitted to switch between the host devices. Each time the user makes such a switch, the user may see and still recognize the familiar slave or host and device user screen, the same graphical user interface (GUI), and same familiar controls and commands.

It is thus now understood how content may be viewed by the handheld wireless display device 100 in different ways, all selectable by the user, including new applications written for the device itself; device applications, web applications, a web browser, etc., and Microsoft Windows SideShow™ applications, or native applications via a virtual network connection.

With the Bluetooth proxy support, the effect of pushing through original hosted device GUI interface, screens, command and control interfaces, may be supported for multiple devices at the same time.

Various other modifications and adaptations may be made to the handheld wireless display device 100 as shown and described above. For example, FIGS. 1A-1E illustrate a "single-eye" or monocular embodiment. However, a binocular arrangement with two displays is also possible. In such biocular example embodiments, an inter-pupillary distance (IPD) adjustment device may be included. With the IPD adjustment device, the requirements for optics may be relaxed. In return, other optical characteristics such as distortion may be improved so that the resolution is good across the entire plane of the image. The eye relief may be fairly large so that one wearing eyeglasses may use the unit comfortably.

Further, after wide acceptance, device makers may incorporate the microdisplay into their own devices. For example, cell phone or laptop or Mobile Internet Devices (e.g., the Apple iPhone) may converge to such a device. Such devices might incorporate the viewing unit as a removable or non-removable element to support a secondary "large image" experience (similar to the regular TFT screen of 10 inches or more) in a small form factor.

In some instances and for some users, it may not be possible or comfortable to hold the handheld wireless display device 100 in one's hand for long term viewing, such as when watching a movie. In those instances, the handheld wireless display device 100 may be placed on a stand or may be tied to a head band, etc.

While this invention has been particularly shown and described with references to example embodiments thereof, it will be understood by those skilled in the art that various changes in form and details may be made therein without departing from the scope of the invention encompassed by the appended claims.

While example embodiments have been particularly shown and described, it will be understood by those skilled in the art that various changes in form and details may be made therein without departing from the scope of the embodiments encompassed by the appended claims.

What is claimed is:

1. A method comprising the sequential steps of:
   transmitting, via a wireless transceiver of a host device, data to a near eye, wearable wireless transfer device;
   receiving, via a wireless transceiver of the near eye, wearable wireless transfer device, the data from the host device, the data being of at least Video Graphic Array quality being received over a RFCOMM or Serial Port Profile Bluetooth wireless connection,
   wherein the data features auto sequencing and guaranteed packet delivery,
   wherein the data comprises audio/visual information received over a first radio frequency channel from the host device and other data transmitted and received over a second radio frequency channel from the host device,
      wherein the other data is not audio/visual information;
and
generating a video signal, from the data, that is suitable for handling by a display driver of the near eye, wearable wireless transfer device,
   wherein the near eye, wearable wireless transfer device has at least one display configured to be a near eye, wearable display, and
   wherein the steps of the method are carried out in an ARM/DSP enabled system;
wherein the near eye, wearable wireless transfer device has a wireless interface configured to implement a packet switching gateway utilizing a Bluetooth physical layer with a Bluetooth proxy; and
wherein the video signal has a packet buffer default size of about 990 bytes.

\* \* \* \* \*